US012294143B2

(12) United States Patent
Diamond et al.

(10) Patent No.: US 12,294,143 B2
(45) Date of Patent: May 6, 2025

(54) METHODS AND SYSTEMS FOR MITIGATING INTERFERENCE WITH A NEARBY SATELLITE

(71) Applicant: Viasat, Inc., Carlsbad, CA (US)

(72) Inventors: Lance B. Diamond, Johns Creek, GA (US); Donald L. Runyon, Duluth, GA (US); Eric L. Cross, Alpharetta, GA (US)

(73) Assignee: Viasat, Inc., Carlsbad, CA (US)

( * ) Notice: Subject to any disclaimer, the term of this patent is extended or adjusted under 35 U.S.C. 154(b) by 0 days.

(21) Appl. No.: 18/679,084

(22) Filed: May 30, 2024

(65) Prior Publication Data
US 2024/0347897 A1 Oct. 17, 2024

Related U.S. Application Data

(63) Continuation of application No. 18/326,713, filed on May 31, 2023, now Pat. No. 12,021,299, which is a (Continued)

(51) Int. Cl.
*H01Q 1/28* (2006.01)
*H01Q 1/42* (2006.01)
(Continued)

(52) U.S. Cl.
CPC ............... *H01Q 1/28* (2013.01); *H01Q 1/42* (2013.01); *H01Q 3/02* (2013.01); *H01Q 3/08* (2013.01);
(Continued)

(58) Field of Classification Search
CPC .. H01Q 1/28; H01Q 1/42; H01Q 3/02; H01Q 3/08; H01Q 3/24; H01Q 21/06;
(Continued)

(56) References Cited

U.S. PATENT DOCUMENTS 6,751,801 B1 6/2004 Frisco et al.
7,136,621 B2 11/2006 De la Chapelle et al.
(Continued)

OTHER PUBLICATIONS

IGT, "Airborne Satellite COTM", www.iDirectGT.com, Sep. 2012, 9 pgs.
(Continued)

*Primary Examiner* — Awat M Salih
(74) *Attorney, Agent, or Firm* — Holland & Hart LLP

(57) ABSTRACT

In one example, an antenna system is described. The antenna system includes a primary antenna on an aircraft. The primary antenna is mechanically steerable and has an asymmetric antenna beam pattern with a narrow beamwidth axis and a wide beamwidth axis at boresight. The antenna system also includes a secondary antenna on the aircraft, the secondary antenna including an array of antenna elements. The antenna system also includes an antenna selection system to control communication of a signal between the aircraft and a target satellite via the primary antenna and the secondary antenna. The antenna selection system switches communication of the signal from the primary antenna to the secondary antenna when a performance characteristic for communication with the target satellite satisfies a threshold due to a position of the aircraft relative to the target satellite.

17 Claims, 19 Drawing Sheets

Related U.S. Application Data continuation of application No. 17/512,369, filed on Oct. 27, 2021, now Pat. No. 11,705,622, which is a continuation of application No. 16/847,783, filed on Apr. 14, 2020, now Pat. No. 11,183,749, which is a continuation-in-part of application No. 16/163,808, filed on Oct. 18, 2018, now Pat. No. 10,784,567, which is a continuation of application No. 15/165,539, filed on May 26, 2016, now Pat. No. 10,135,126.

(60) Provisional application No. 62/171,418, filed on Jun. 5, 2015.

(51) Int. Cl.
  *H01Q 3/02* (2006.01)
  *H01Q 3/08* (2006.01)
  *H01Q 3/24* (2006.01)
  *H01Q 21/06* (2006.01)
  *H01Q 21/28* (2006.01)
  *H04B 7/06* (2006.01)
  *H04B 7/08* (2006.01)
  *H04B 7/185* (2006.01)
  *H04B 7/195* (2006.01)

(52) U.S. Cl.
  CPC ............... *H01Q 3/24* (2013.01); *H01Q 21/06* (2013.01); *H01Q 21/28* (2013.01); *H04B 7/0608* (2013.01); *H04B 7/0814* (2013.01); *H04B 7/18508* (2013.01); *H04B 7/1851* (2013.01); *H04B 7/195* (2013.01)

(58) Field of Classification Search
  CPC .. H01Q 21/28; H04B 7/0608; H04B 7/18508; H04B 7/1851; H04B 7/195
  See application file for complete search history.

(56) References Cited

U.S. PATENT DOCUMENTS

| | | |
|---|---|---|
| 7,408,898 B1 | 8/2008 | Brown |
| 7,629,935 B2 | 12/2009 | Mansour et al. |
| 7,630,683 B2 | 12/2009 | De la Chapelle et al. |
| 7,768,469 B2 | 8/2010 | Mansour et al. |
| 7,999,750 B2 | 8/2011 | Mansour et al. |
| 8,176,520 B1* | 5/2012 | Mitchell ............ H04N 21/6143 709/248 |
| 8,499,324 B1 | 7/2013 | Mitchell et al. |
| 8,737,925 B2 | 5/2014 | Beeler et al. |
| 9,621,850 B1 | 4/2017 | Mitchell |
| 10,135,126 B2 | 11/2018 | Diamond et al. |
| 2002/0058478 A1 | 5/2002 | De la Chapelle et al. |
| 2002/0144272 A1 | 10/2002 | McLain et al. |
| 2003/0097658 A1 | 5/2003 | Richards |
| 2005/0085186 A1 | 4/2005 | Sandrin |
| 2006/0035588 A1 | 2/2006 | De la Chapelle et al. |
| 2009/0022088 A1 | 1/2009 | Wahlberg et al. |
| 2011/0215985 A1 | 9/2011 | Kaplan et al. |
| 2012/0200458 A1 | 8/2012 | Jalali et al. |
| 2014/0145887 A1 | 5/2014 | Irvine |
| 2014/0225767 A1 | 8/2014 | Cordone |
| 2014/0225768 A1 | 8/2014 | Engel et al. |
| 2016/0119938 A1* | 4/2016 | Frerking ............... H04W 72/56 370/316 |
| 2017/0358851 A1 | 12/2017 | Diamond et al. |
| 2018/0138931 A1 | 5/2018 | Lung et al. |
| 2022/0272084 A1 | 8/2022 | Hyatt |

OTHER PUBLICATIONS

Shroyer, "Satcom—On-The-Move Why One Size Doesn't Fit All", General Dynamics SATCOM Technologies, Military Communications Conference MILCOM, 2012, 6 pgs.

White Paper, "Adjusting Equivalent Isotropic Radiated Power per Bandwidth as a Function of SKEW Angle for RINC 791 Antenna Systems", Oct. 24, 2011, 16 pgs.

* cited by examiner

METHODS AND SYSTEMS FOR MITIGATING INTERFERENCE WITH A NEARBY SATELLITE

CROSS-REFERENCE TO RELATED APPLICATIONS

The present application for patent is a continuation of U.S. patent application Ser. No. 18/326,713 titled "Methods and Systems For Mitigating Interference With A Nearby Satellite" filed May 31, 2023, which is a continuation of U.S. patent application Ser. No. 17/512,369 titled "Methods and Systems For Mitigating Interference With A Nearby Satellite," filed Oct. 27, 2021, which is a continuation of U.S. patent application Ser. No. 16/847,783, titled "Methods and Systems For Mitigating Interference With A Nearby Satellite" filed Apr. 14, 2020, which is a continuation in part of U.S. Non-Provisional application Ser. No. 16/163,808, titled "Methods and Systems for Mitigating Interference with a Nearby Satellite", filed Oct. 18, 2018, which is a continuation of U.S. Non-Provisional application Ser. No. 15/165,539, titled "Methods and Systems for Mitigating Interference with a Nearby Satellite", filed May 26, 2016, which claims priority to U.S. Provisional Application No. 62/171,418, titled "Methods and Systems for Mitigating Interference with a Nearby Satellite", filed Jun. 5, 2015, each of which are expressly incorporated by reference herein, in their entirety.

BACKGROUND

The present disclosure relates generally to satellite communications, and more specifically, to airborne systems and methods for using such systems to satisfy performance characteristics with one or more satellite e.g., by avoiding excessive interference with one or more non-target satellites during communication with a target satellite.

A geostationary satellite is a satellite that is in geostationary Earth orbit (GEO) about 35,800 km above Earth's equator and has a revolution around the Earth synchronized with Earth's rotation. As a result, the geostationary satellite appears stationary to an observer on the Earth's surface.

Geostationary satellites occupy orbital slots separated in longitude along the geostationary arc above the Earth's equator. These geostationary satellites, which operate using various frequencies and polarizations, provide a variety of broadcast and communication services. Other types of satellites include low Earth orbit (LEO) satellites set between about 160 km and 2,000 km above Earth's surface, and medium Earth orbit (MEO) satellites set in orbit with an altitude greater than about 2,000 km and less than about 35,800 km above Earth's surface.

An Earth-based antenna terminal for communication with a satellite typically has high antenna gain and a narrow main beam pointed at the satellite, because of the large distance to the satellite and to avoid interference with other satellites. In order to satisfy interference requirements with the other satellites, a mobile antenna terminal may only be permitted to communicate with the target satellite when at certain geographic locations. Similarly, a mobile antenna terminal may be unable to communicate with a target satellite while located in sub-satellite points (e.g., when positioned directly, or substantially directly, under the target satellite) or during high banking events (e.g., while an aircraft that holds the mobile antenna terminal executes a turning maneuver). In such cases, services provided by the satellite are unavailable to users of the mobile antenna terminal while at these locations, even though they are within the coverage area of the satellite.

SUMMARY

In one example, an antenna system for mounting on an aircraft is described. The antenna system includes a primary antenna on the aircraft. The primary antenna is mechanically steerable and has an asymmetric antenna beam pattern with a narrow beamwidth axis and a wide beamwidth axis at boresight. The antenna system also includes a secondary antenna on the aircraft. The secondary antenna includes an array of antenna elements. The secondary antenna may also be mechanically steerable. In some examples, a range of the secondary antenna may be less than the primary antenna.

The antenna system also includes an antenna selection system to control communication of a signal between the aircraft and a target satellite via the primary antenna and the secondary antenna. In some examples, the antenna selection system switches communication of the signal from the primary antenna to the secondary antenna when a performance characteristic for communicating with the target satellite reaches a threshold. In some examples of switching based on a performance characteristic, the antenna selection system switches communication of the signal from the primary antenna to the secondary antenna when an amount of interference with a non-target satellite reaches a threshold—e.g., due to the wide beamwidth axis of the asymmetric antenna beam pattern. In some examples of switching based on a performance characteristic, the antenna selection system switches communication of the signal from the primary antenna to the secondary antenna when a slew rate of the primary antenna reaches a threshold. In some examples of switching based on a performance characteristic, the antenna selection system switches communication of the signal from the primary antenna to the secondary antenna when a pointing error of the primary antenna to the target satellite reaches a threshold. In some examples of switching based on a performance characteristic, the antenna selection system switches communication of the signal from the primary antenna to the secondary antenna when a distance between the primary antenna and a target satellite reaches a threshold e.g., while a handover procedure is performed between the target satellite and another target satellite.

In another example, a method is described that includes communicating a signal between a target satellite and an aircraft via a primary antenna on the aircraft. The primary antenna is mechanically steerable and has an asymmetric antenna beam pattern with a narrow beamwidth axis and a wide beamwidth axis at boresight. The method also includes determining that an amount of interference with a non-target satellite reaches a threshold due to the wide beamwidth axis of the asymmetric antenna beam pattern. The method also includes, in response to the determination, switching communication of the signal from the primary antenna to a secondary antenna on the aircraft to reduce interference with the non-target satellite. The secondary antenna includes an array of antenna elements.

In another example, a method is described that includes communicating a signal between a target satellite and an aircraft via a primary antenna on the aircraft. The primary antenna is mechanically steerable and has an asymmetric antenna beam pattern with a narrow beamwidth axis and a wide beamwidth axis at boresight. The method also includes determining that a quality of a communication link with a target satellite reaches a threshold due to a pointing error of the primary antenna to the target satellite. The method also includes, in response to the determination, switching communication of the signal from the primary antenna to a secondary antenna on the aircraft to increase a quality of the communication link with the target satellite. The secondary antenna includes an array of antenna elements.

In another example, a method is described that includes communicating a signal between a target satellite and an aircraft via a primary antenna on the aircraft. The primary antenna is mechanically steerable and has an asymmetric antenna beam pattern with a narrow beamwidth axis and a wide beamwidth axis at boresight. The method also includes determining that a quality of a communication link with a target satellite reaches a threshold due to an upper bound of a range for communications between the primary antenna and the target satellite being approached. The method also includes, in response to the determination, establishing another communication link between the secondary antenna and another target satellite. The method also includes switching, after the other communication link is established, communication of the signal from the primary antenna to a secondary antenna to improve a handover of communications for the aircraft to the other target satellite. The secondary antenna includes an array of antenna elements.

In yet another example, an antenna system for mounting on an aircraft for communication with a target satellite is described. The antenna system includes a primary antenna comprising a first array of antenna elements and a positioner. The first array of antenna elements has a first main beam with a horizontal half-power beamwidth along a horizontal axis of the first array and has a vertical half-power beamwidth along a vertical axis of the first array. The vertical half-power beamwidth is greater than the horizontal half power beamwidth. The positioner is rotatably coupled with the first array about at least a first axis and a second axis to point the first main beam at the target satellite. The first main beam has a composite half power beamwidth that is less than or equal to a particular value over a first range of skew angles. The first main beam has a composite half power beamwidth that is greater than the particular value over a second range of skew angles.

The antenna system also includes a secondary antenna oriented relative to the primary antenna. The secondary antenna includes a second array of antenna elements having a second main beam and a steering mechanism to point the second main beam at the target satellite. The steering mechanism may include a positioner that is rotatably coupled with the second array about at least a first axis. In some examples, the rotation of the secondary antenna is restricted relative to the rotation of the primary antenna. The second main beam has a composite half power beamwidth that is less than or equal to the particular value over the second range of skew angles. The antenna system also includes an antenna selection system to select between the primary antenna and the secondary antenna for communication of a signal with the target satellite based on the skew angle.

In yet another example, an antenna system for mounting on an aircraft is described. The antenna system includes a primary antenna on the aircraft. The primary antenna has a first acceptable service area for communication of a signal between the aircraft and a target satellite while satisfying a performance characteristic for communicating with a target satellite (e.g., an interference requirement with a non-target satellite, a slew rate of a primary antenna, a pointing error threshold for communicating with the target satellite). The antenna system also includes a secondary antenna on the aircraft. The secondary antenna has a second acceptable service area for communication of the signal between the aircraft and the target satellite while satisfying a performance characteristic for communicating with the target satellite. The second acceptable service area is different than the first acceptable service area. The antenna system also includes an antenna selection system to control communication of the signal between the aircraft and the target satellite via the primary antenna and the secondary antenna. The antenna selection system switches communication of the signal between the primary antenna and the secondary antenna based on a geographic location of the aircraft and the first and second acceptable service areas.

DETAILED DESCRIPTION

Figure 1:
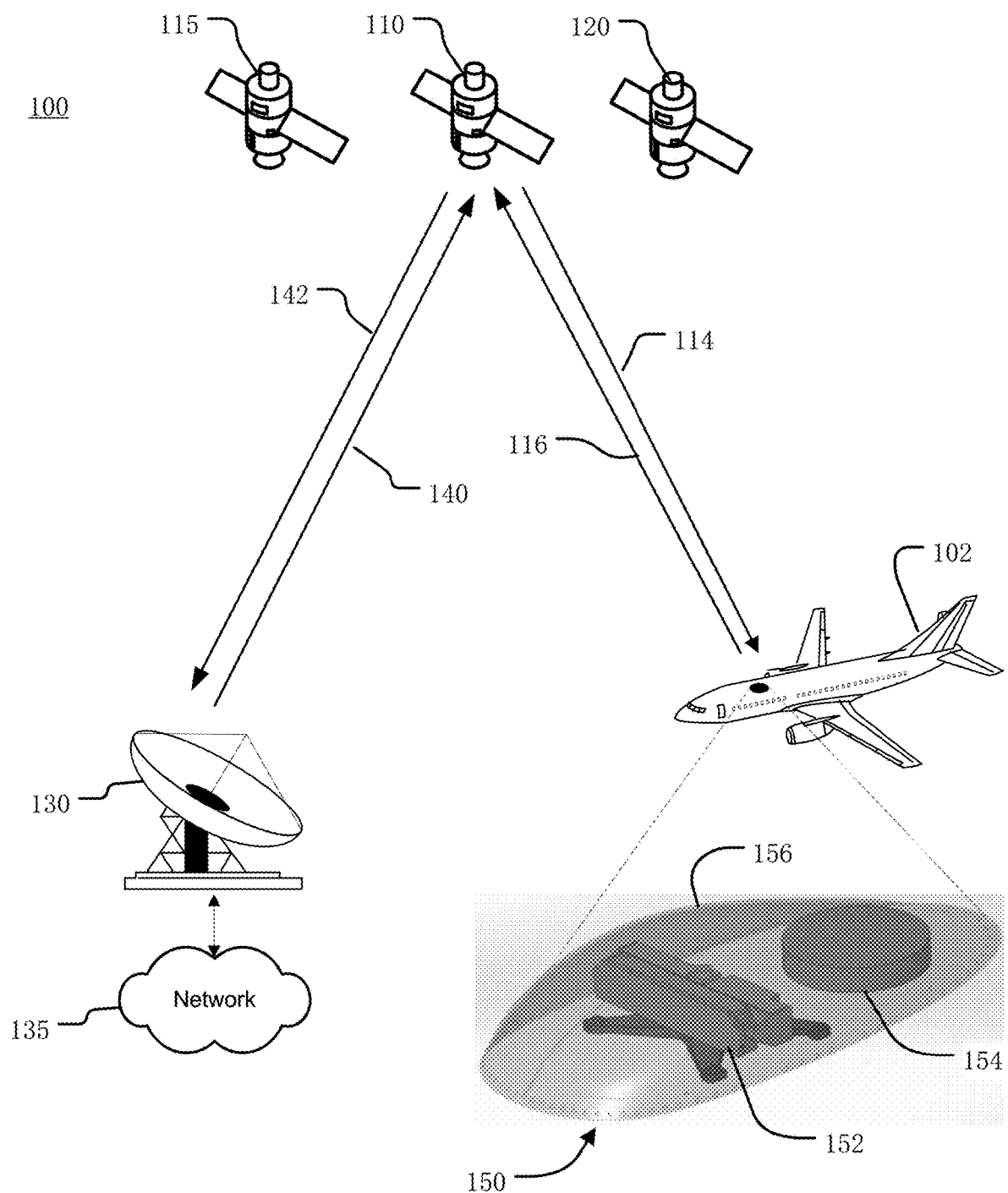
FIG. 1 illustrates an example satellite communications system in which an antenna system as described herein can be used to satisfy performance characteristics with one more satellites.

An airborne antenna system described herein can provide efficient communication with a target satellite over a large geographical area, while also satisfying interference requirements with other satellites. In some examples, the airborne antenna system can provide non-interfering communication with a target satellite over the entire, or substantially the entire, coverage area (or footprint) of the target satellite. In some examples, an airborne antenna system may provide communication with a target satellite that satisfies a performance characteristic for communicating with the target satellite over the entire, or substantially the entire, coverage area (or footprint) of the target satellite-including when the airborne antenna system enters a keyhole region of the target satellite. In doing so, services such as Internet, telephone and/or television services provided by the target satellite can be delivered to airborne users throughout most or all of the satellite's coverage area, while also satisfying interference requirements with other satellites.

An airborne antenna system described herein can also provide efficient communication with an array of satellites over a large geographical area, while also satisfying interference requirements with other satellites. In some examples, the airborne antenna system may provide efficient handover of communications from one target satellite to another target satellite. In some examples, the handover may be performed without a data connection between the airborne antenna system and a satellite network being lost as the target satellite exits a transmission range of the airborne antenna system. In doing so, services such as Internet, telephone and/or television services provided by the target satellite can be delivered to airborne users without interruption.

The antenna system can include a primary antenna and a secondary antenna on an aircraft such as an airplane. The antenna system can also include an antenna selection system to control communication of one or more signals between the aircraft and the target satellite via the primary antenna and the secondary antenna.

The primary antenna can be mechanically steerable about at least one axis to point a main beam of the primary antenna at the target satellite. As used herein, a main beam of an antenna that is "pointed" at a satellite has sufficient antenna gain in the direction of the target satellite to permit communication of one or more signals. The communication can be bidirectional (i.e., the antenna transmits a signal to the satellite and also receives a signal from the satellite) or unidirectional (i.e., the antenna either transmits a signal to the satellite or receives a signal from the satellite, but not both). The direction of the target satellite may be boresight of the antenna. As used herein, "boresight" of an antenna refers to the direction of maximum gain of the antenna. Alternatively, the gain in the direction of the target satellite may be less than the maximum gain of the antenna. In other words, the direction of the satellite may not be in the exact center of the main beam of the antenna. This may for example be due to motion induced pointing accuracy limitations of the antenna, which may be associated with pointing error to a target satellite.

In examples described herein, the primary antenna has a non-circular antenna aperture that results in an asymmetric antenna beam pattern at boresight. The non-circular shape of the antenna aperture can be due to the combination of electrical performance requirements and size constraints. Specifically, the non-circular antenna aperture of the primary antenna is designed to have a large enough effective area to provide sufficient antenna gain to satisfy link requirements between the aircraft and the target satellite under various operational conditions, while also having a swept volume small enough that it can be housed under an aerodynamic radome on the aircraft. The primary antenna can vary from example to example. In one example, the primary antenna is an array of antenna elements arranged in a rectangular panel.

The asymmetric antenna beam pattern of the primary antenna has a narrow beamwidth axis and a wide beamwidth axis at boresight. As described in more detail below, when the antenna system is at certain geographic locations, the wide beamwidth axis can give rise to excessive interference with one or more other (non-target) satellites, if the primary antenna were used to communicate with the target satellite. As also described in more detail below, when the antenna system is at certain geographic locations relative to a target satellite, pointing accuracy limitations of the primary antenna may prevent the primary antenna from maintaining a connection with the target satellite as the aircraft carrying the primary antenna moves relative to the target satellite, or vice versa—e.g., when the target satellite crosses above the aircraft or while the aircraft performs a tight banking maneuver. As also described in more detail below, during a handover procedure, pointing accuracy limitations of the primary antenna may result in an interruption in data service as the primary antenna is repositioned in the direction of a new target satellite.

The antenna system described herein can avoid the excessive interference that could result due to the wide beamwidth axis of the primary antenna, thereby allowing non-interfering communication with the target satellite over a large geographic area. Also, the antenna system described herein can avoid an interruption in data service that could result due to pointing accuracy limitations of a primary antenna, thereby allowing seamless communication with the target satellite over a large geographic area. Similarly, the antenna system described herein can avoid an interruption in data service while communications are handed over from one target satellite to another target satellite, thereby allowing seamless communication with multiple target satellites.

As described in more detail below, the antenna system includes a secondary antenna, which can be located underneath the same radome as the primary antenna, and an antenna selection system. The secondary antenna can be a different type of antenna than the primary antenna, and/or have a different beam steering mechanism than the primary antenna. In some examples, the secondary antenna can be mechanically steerable about at least one axis to point a main beam of the secondary antenna at the target satellite or another target satellite that is associated with a handover procedure.

The antenna selection system controls whether the primary antenna or the secondary antenna is used to communicate each of the one or more signals communicated between the aircraft and the target satellite. Using the techniques described herein, the antenna selection system can determine when a performance characteristic for communicating with a target satellite satisfies a threshold. The performance characteristic may include the amount of interference with one or more non-target satellites, a slew rate of a primary antenna, a pointing error of the primary antenna to a target satellite, a distance between the primary antenna and a target satellite, and the like. In response to the determination, the antenna selection system can switch to communicating with the target satellite using the secondary antenna.

For example, the antenna selection system may switch to the secondary antenna after determining that the amount of interference with one or more non-target satellites using the primary antenna, due to the wide beamwidth axis, reaches a threshold. In doing so, the antenna system described herein can provide communication with the target satellite at locations where use of the primary antenna is precluded due to interference requirements. As a result, the service area over which services provided by the target satellite can be delivered to airborne users can be larger as compared to only using the primary antenna.

In another example, the antenna selection system may switch to the secondary antenna after determining that a slew rate of the primary antenna, due to a position of the target satellite relative to the primary antenna, reaches a threshold. In doing so, the antenna system described herein can provide communication with the target satellite at locations where use of the primary antenna is precluded due to a location of the target satellite relative to positioning of an aircraft that houses the primary antenna—e.g., when the aircraft is within a keyhole region of the target satellite. As a result, the service area over which services provided by the target satellite can be delivered to airborne users can be larger as compared to only using the primary antenna.

In another example, the antenna selection system may switch to the secondary antenna after determining that a pointing error of the primary antenna to the target satellite, due to a position of the target satellite relative to the primary antenna, reaches a threshold. In doing so, the antenna system described herein can provide communication with the target satellite at locations where use of the primary antenna is precluded due to a location of the target satellite relative to positioning of an aircraft that houses the primary antenna—e.g., when the target satellite is located outside of a field of view of the primary antenna. As a result, the service area over which services provided by the target satellite can be delivered to airborne users can be larger as compared to only using the primary antenna.

In another example, the antenna selection system may switch to the secondary antenna after determining that a distance from the primary antenna to the target satellite, due to a trajectory and velocity of the target satellite and/or aircraft, reaches a threshold. In such cases, the secondary antenna may be pointed at another target satellite that is within a distance threshold from the secondary antenna. In doing so, the antenna system described herein can provide for seamless handover procedures between target satellites—e.g., handovers that are performed without interrupting a data connection.

FIG. 1 illustrates an example satellite communications system 100 in which an antenna system 150 as described herein can be used to satisfy performance characteristics with one more satellites. Many other configurations are possible having more or fewer components than the satellite communication system 100 of FIG. 1.

As can be seen in FIG. 1, the antenna system 150 is mounted on aircraft 102. In the illustrated example, the aircraft 102 is an airplane. Alternatively, the antenna system 150 can be mounted to other types of aircraft, such as a helicopter, drone, etc.

As described in more detail below, the antenna system 150 facilitates efficient communication between the aircraft 102 and satellite 110 (hereinafter referred to as the "target satellite 110"), while also satisfying interference requirements with one or more other (non-target) satellites. As described in more detail below, the antenna system 150 may also facilitate efficient communication between the aircraft 102 and another satellite 115 (hereinafter referred to as the "second target satellite 115").

The antenna system 150 includes an antenna selection system (not shown) to control communication of one or more signals with the target satellite 110 via a primary antenna 152 and a secondary antenna 154, using the techniques described herein. In the illustrated example, the primary antenna 152 and the secondary antenna 154 are located under the same radome 156. Alternatively, the primary antenna 152 and the secondary antenna 154 can be located under separate radomes on the aircraft.

In some examples in which the primary antenna 152 and the secondary antenna 154 are located under the same radome 156, the shape of the radome 156 may be designed to house the primary antenna 152 and satisfy aerodynamic requirements, and the secondary antenna 154 may be selected or designed to fit within remaining room under the radome 156.

The antenna system 150 can also include memory for storage of data and applications, a processor for accessing data and executing applications, and components that facilitate communication over the satellite communication system 100. Although only one aircraft 102 is illustrated in FIG. 1 to avoid over complication of the drawing, the satellite communications system 100 can include many more aircraft 102 having respective antenna systems 150 mounted thereon.

In the illustrated example, the target satellite 110 provides bidirectional communication between the aircraft 102 and a gateway terminal 130. The gateway terminal 130 is sometimes referred to as a hub or ground station. The gateway terminal 130 includes an antenna to transmit a forward uplink signal 140 to the target satellite 110 and receive a return downlink signal 142 from the target satellite 110. The gateway terminal can also schedule traffic to the antenna system 150. Alternatively, the scheduling can be performed in other parts of the satellite communications system 100 (e.g., a core node, satellite access node, or other components, not shown). Signals 140, 142 communicated between the gateway terminal 130 and target satellite 110 can use the same, overlapping, or different frequencies as signals 112, 114 communicated between the target satellite 110 and the antenna system 150.

Network 135 is interfaced with the gateway terminal 130. The network 135 can be any type of network and can include for example, the Internet, an IP network, an intranet, a wide area network (WAN), a local area network (LAN), a virtual private network (VPN), a virtual LAN (VLAN), a fiber optic network, a cable network, a public switched telephone network (PSTN), a public switched data network (PSDN), a public land mobile network, and/or any other type of network supporting communication between devices as described herein. The network 135 can include both wired and wireless connections as well as optical links. The network 135 can include both wired and wireless connections as well as optical links. The network 135 can connect multiple gateway terminals 130 that can be in communication with target satellite 110 and/or with other satellites.

The gateway terminal 130 can be provided as an interface between the network 135 and the target satellite 110. The gateway terminal 130 can be configured to receive data and information directed to the antenna system 150 from a source accessible via the network 135. The gateway terminal 130 can format the data and information and transmit forward uplink signal 140 to the target satellite 110 for delivery to the antenna system 150. Similarly, the gateway terminal 130 can be configured to receive return downlink signal 142 from the target satellite 110 (e.g., containing data and information originating from the antenna system 150) that is directed to a destination accessible via the network 135. The gateway terminal 130 can also format the received return downlink signal 142 for transmission on the network 135.

The target satellite 110 can receive the forward uplink signal 140 from the gateway terminal 130 and transmit corresponding forward downlink signal 114 to the antenna system 150. Similarly, the target satellite 110 can receive return uplink signal 116 from the antenna system 150 and transmit corresponding return downlink signal 142 to the gateway terminal 130. The target satellite 110 can operate in a multiple spot beam mode, transmitting and receiving a number of narrow beams directed to different regions on Earth. Alternatively, the target satellite 110 can operate in wide area coverage beam mode, transmitting one or more wide area coverage beams.

The target satellite 110 can be configured as a "bent pipe" satellite that performs frequency and polarization conversion of the received signals before retransmission of the signals to their destination. As another example, the target satellite 110 can be configured as a regenerative satellite that demodulates and remodulates the received signals before retransmission.

As shown in FIG. 1, the satellite communications system 100 also includes another satellite 120 (hereinafter referred to as "non-target satellite 120"). Communication of one or more signals between the non-target satellite 120 and the antenna system 150 is undesired or unintended. Although only one non-target satellite 120 is illustrated in FIG. 1 to avoid over complication of the drawing, the satellite communications system 100 can include many more non-target satellites 120 and the techniques described herein can be used to avoid excessive interference with each of the non-target satellites 120.

The non-target satellite 120 can, for example, be configured as a bent pipe or regenerative satellite. The non-target satellite 120 can communicate one or more signals with one or more ground stations (not shown) and/or other terminals (not shown).

As mentioned above, the antenna system 150 includes an antenna selection system to control communication with the target satellite 110 via the primary antenna 152 and the secondary antenna 156, while satisfying performance characteristics for communicating with the target satellite 100—e.g., by avoiding excessive interference with the non-target satellite 120. The antenna system 150 is described in more detail below with respect to FIGS. 2-3 and others.

As used herein, interference "with" the non-target satellite 120 can refer to uplink interference and/or downlink interference. Uplink interference is interference to the non-target satellite 120 caused by a portion of the return uplink signal 116 transmitted by the antenna system 150 that is received by the non-target satellite 120. Downlink interference is interference to the antenna system 150 caused by a portion of a signal transmitted by the non-target satellite 120 that is received by the antenna system 150.

The second target satellite 115 may be similarly configured as the target satellite 110 and may perform similar operations as the target satellite 110. Communications between the target satellite 110 and the aircraft 102 may be transferred to second target satellite 115—e.g., as the aircraft 102 exits a transmission range of the target satellite 110, or vice versa. After communications are handed over to the second target satellite 115, the aircraft 102 may communicate with second target satellite 115 as similarly described for the target satellite 110.

As mentioned above, the antenna system 150 may control communication with the target satellite 110 via the primary antenna 152 and the secondary antenna 156 to obtain interrupted data service with the target satellite 110. As also mentioned above, the antenna system 150 may control communication with the target satellite 110 and the second target satellite via the primary antenna 152 and the secondary antenna 156 to provide an interrupted data service while communications for the aircraft 102 are handed over between the target satellite 110 and the second target satellite 115. The antenna system 150 is described in more detail below with respect to FIGS. 2 and 3, and others.

In the illustrated example, the target satellite 110, the second target satellite 115, and the non-target satellite 120 are each geostationary satellites. The geostationary orbit slots, and thus the angular separation along the geostationary arc between the target satellite 110, the second target satellite 115, and/or the non-target satellite 120, can vary from example to example. In some examples the angular separation along the geostationary arc is at least two degrees. In alternative examples, one or all of the target satellite 110, the second target satellite 115, and the non-target satellite 120 can be a non-geostationary satellite, such as a LEO or MEO satellite. The non-target satellite 120 can for example be adjacent to the target satellite 110. As used herein, the target satellite 110 and the non-target satellite 120 are "adjacent" if the effective angular separation between them as viewed at antenna system 150 is less than or equal to 10 degrees.

Figure 2A:
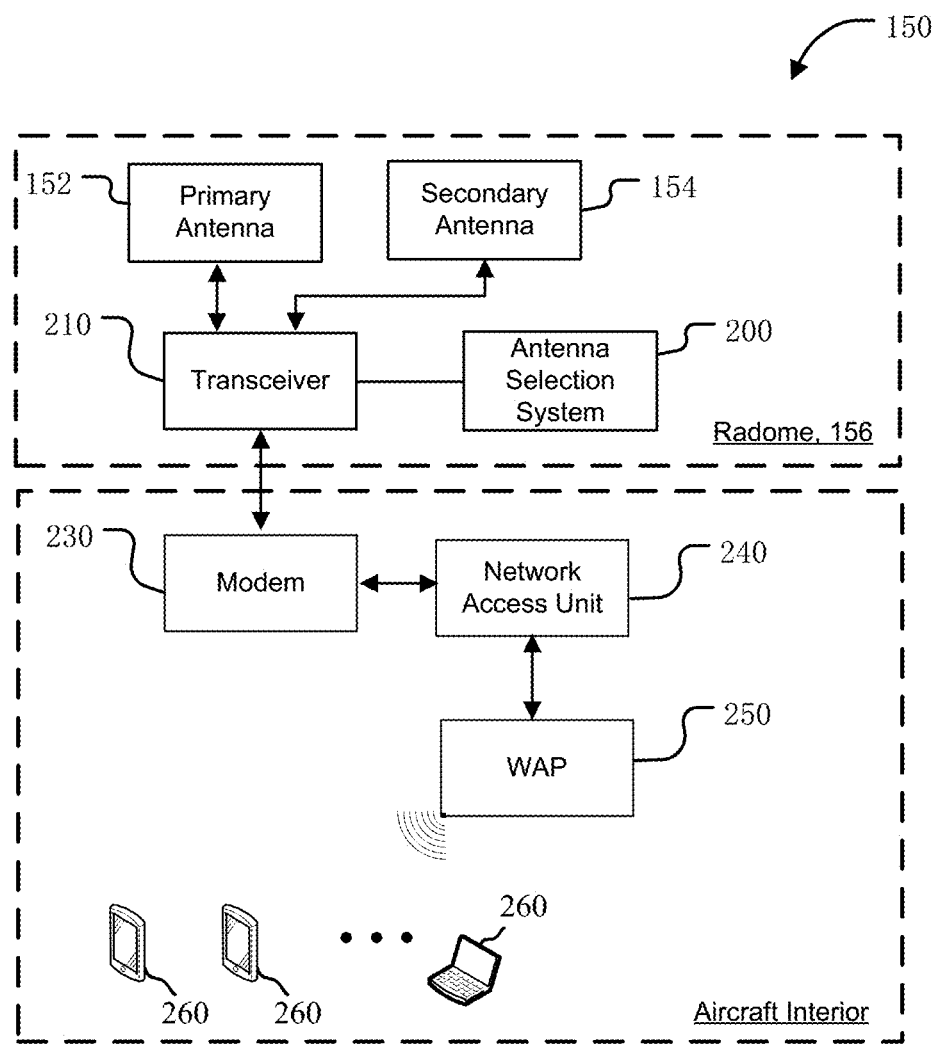
FIGS. 2A through 2C are block diagrams illustrating example antenna systems on the aircraft of FIG. 1.

FIG. 2A is a block diagram illustrating an example antenna system 150 on the aircraft 102 of FIG. 1. The antenna system 150 can include primary antenna 152, secondary antenna 154, antenna selection system 200, transceiver 210, modem 230, network access unit (NAU) 240, and wireless access point (WAP) 250. Many other configurations are possible having more or fewer components than the antenna system 150 shown in FIG. 2A. Moreover, the functionalities described herein can be distributed among the components in a different manner than described herein.

In the illustrated example, the primary antenna 152 and the secondary antenna 154 are each housed under the same radome 156 disposed on the top of the fuselage or other location (e.g., on the tail, etc.) of the aircraft 102. Alternatively, the primary antenna 152 and the secondary antenna 154 can be housed under separate radomes which can be located in different locations on the aircraft 102.

The antenna system 150 can provide for transmission of the forward downlink signal 114 and reception of the return uplink signal 116 to support two-way data communications between data devices 260 within the aircraft 102 and the network 135 via target satellite 110 and gateway terminal 130. The data devices 260 can include mobile devices (e.g., smartphones, laptops, tablets, netbooks, and the like) such as personal electronic devices (PEDs) brought onto the aircraft 102 by passengers. As further examples, the data devices 260 can include passenger seat back systems or other devices on the aircraft 102. The data devices 260 can communicate with the network access unit 240 via a communication link that can be wired and/or wireless. The communication link can be, for example, part of a local area network such as a wireless local area network (WLAN) supported by WAP 250. One or more WAPs can be distributed about the aircraft 102, and can, in conjunction with network access unit 240, provide traffic switching or routing functionality; for example, as part of a WLAN basic service set (BSS) or extended service set (ESS), etc. The network access unit 240 can also allow passengers to access one or more servers (not shown) local to the aircraft 102, such as a server that provides in-flight entertainment.

In operation, the network access unit 240 can provide uplink data received from the data devices 260 to the modem 230 to generate modulated uplink data (e.g., a transmit IF signal) for delivery to the transceiver 210. The transceiver 210 can upconvert and then amplify the modulated uplink data to generate the return uplink signal 116 (FIG. 1) for transmission to the target satellite 110 (FIG. 1) via the primary antenna 152 or the secondary antenna 154. Similarly, the transceiver 210 can receive the forward downlink signal 114 (FIG. 1) from the target satellite 110 (FIG. 1) via the primary antenna 152 or the secondary antenna 154. The transceiver 210 can amplify and then downconvert the forward downlink signal 114 to generate modulated downlink data (e.g., a receive IF signal) for demodulation by the modem 230. The demodulated downlink data from the modem 230 can then be provided to the network access unit 240 for routing to the data devices 260. The modem 230 can be integrated with the network access unit 240, or can be a separate component, in some examples.

In the illustrated example, the transceiver 210 is located outside the fuselage of the aircraft 102 and under the radome 156. Alternatively, the transceiver 210 can be located in a different location, such as within the aircraft interior. In the illustrated example, the transceiver 210 is shared between the primary antenna 152 and the secondary antenna 154. Alternatively, the antenna system 150 may include a first transceiver coupled to the primary antenna 152, and a second transceiver coupled to the secondary antenna 154. In such a case, the modem 230 may be shared by the first transceiver and the second transceiver or may use separate modems.

As described in more detail below, the antenna selection system 200 can control whether the primary antenna 152 or the secondary antenna 154 is used to receive the forward downlink signal 114 from the target satellite 110, and also whether the primary antenna 152 or the secondary antenna 154 is used to transmit the return uplink signal 116 to the target satellite 110. The functions of the antenna selection system 200 can be implemented in hardware, instructions embodied in a memory and formatted to be executed by one or more general or application-specific processors, firmware, or any combination thereof. In the illustrated example, the antenna selection system 200 is shown as a separate device. Alternatively, some or all of the components or features of the antenna selection system 200 can be implemented within one or more other components of the antenna system 150. In the illustrated example, the antenna selection system 200 is located under the radome 156. Alternatively, some or all of the antenna selection system 200 can be located in a different location, such as within the aircraft interior. As another example, some or all of the antenna selection system 200 may be located in other parts of the satellite communications system 100, such as the gate terminal 130, a core node, satellite access node, or other components not shown.

The primary antenna 152 can include an array of antenna elements that are operable over the frequency ranges of both the forward downlink signal 114 and the return uplink signal 116. In such a case, the same antenna elements of the array can transmit the return uplink signal 116 and receive forward downlink signal 114. Alternatively, the primary antenna 152 can include a first group of one or more antenna elements to transmit the return uplink signal 116, and a second group of one or more antenna elements to receive forward downlink signal 114.

The primary antenna 152 can include a positioner rotatably coupled to the array of the primary antenna 152 to mechanically steer the array about at least one axis to point the main beam of the array of the primary antenna 152 at the target satellite 110 as the aircraft 102 moves. In some examples, the primary antenna 152 is fully mechanically steered using an elevation-over-azimuth (EL/AZ), two-axis positioner. Alternatively, the positioner may include other mechanisms for providing adjustment in azimuth and elevation. For example, in some alternative examples, the primary antenna 152 can include a combination of mechanical and electrical scanning mechanisms. As another example, the primary antenna 152 is fully mechanically steered using a three-axis positioner that provides adjustment in azimuth, elevation and skew (e.g., skewing an asymmetric antenna beam pattern of the antenna). The primary antenna 152 can also include an antenna control unit to provide control signals to the positioner.

The primary antenna 152 has a non-circular antenna aperture that results in an asymmetric antenna beam pattern of the main beam at boresight. The non-circular shape of the antenna aperture can be due to the combination of electrical performance requirements and size constraints. Specifically, the non-circular antenna aperture of the primary antenna 152 can be designed to have a large enough effective area to provide sufficient antenna gain to satisfy link requirements between the aircraft 102 and the target satellite 110 under various operational conditions, while also having a swept volume small enough that it can be housed under an aerodynamic radome 156 on the aircraft 102.

The primary antenna 152 can be any type of antenna that fits under an aerodynamic radome and provides an asymmetric antenna beam pattern and can vary from example to example. In some examples, the primary antenna 152 is an array of waveguide antenna elements arranged in a rectangular panel. Each of the one or more antenna elements can include a waveguide-type feed structure including a horn antenna. Alternatively, other types of structures and antenna elements can be used for the primary antenna 210. For example, in another example, the primary antenna 210 can include one or more feeds illuminating a reflector having an asymmetric reflector surface. As another example, the primary antenna 152 can include multiple, separately moveable panels that together provides an asymmetric antenna aperture.

The asymmetric antenna beam pattern of the primary antenna 152 has a wide beamwidth axis and a narrow beamwidth axis. In some cases, the wide beamwidth axis may correspond to a vertical beamwidth (or a beamwidth argon the vertical axis) and the narrow beamwidth may correspond to a horizontal beamwidth (or a beamwidth along the horizontal axis). As described in more detail below, when the antenna system 150 (and thus the aircraft 102) is at certain geographic locations or communicating with satellites at certain locations relative to the aircraft 102, performance characteristics for communicating with the target satellite 110 may fail, if the primary antenna 152 were used to communicate with the target satellite 110. In some examples, using the primary antenna 152 to communicate with the target satellite 100 causes performance characteristics to fail when the wide beamwidth axis of the primary antenna causes excessive interference with the non-target satellite 120. In some examples, using the primary antenna 152 to communicate with the target satellite 110 causes performance characteristics to fail when the slew rate of the primary antenna causes exceeds a threshold. In some examples, using the primary antenna 152 to communicate with the target satellite 110 causes performance characteristics to fail when the pointing error from the primary antenna 152 to the target satellite 110 exceeds a threshold. In some examples, using the primary antenna 152 to communicate with the target satellite 110 causes performance characteristics to fail when a distance between the target satellite 110 and the primary antenna 152 exceeds a threshold.

When using the primary antenna 152 to communicate with the target satellite 110, the antenna selection system 200 can switch to communicating with the target satellite 110 using the secondary antenna 154 when the amount of interference with the non-target satellite 120, due to the wide beamwidth axis, reaches a threshold. In doing so, the antenna system 150 can provide communication with the target satellite 110 at geographic locations where use of the primary antenna 152 is precluded due to interference requirements. As a result, the techniques described herein can ensure that the interference generated is within acceptable limits to other satellite system operators, while at the same time satisfying link requirements between the aircraft 102 and the target satellite 110.

When using the primary antenna 152 to communicate with the target satellite 110, the antenna selection system 200 can switch to communicating with the target satellite 110 using the secondary antenna 154 when the slew rate of the primary antenna 152, due to a position of the aircraft 102 relative to the target satellite 110, reaches a threshold. In doing so, the antenna system 150 can provide communication with the target satellite 110 at geographic locations where use of the primary antenna 152 is precluded due to pointing accuracy limitations of the primary antenna 152. As a result, the techniques described herein can ensure link requirements are satisfied between the aircraft 102 and the target satellite 110.

When using the primary antenna 152 to communicate with the target satellite 110, the antenna selection system 200 can switch to communicating with the target satellite 110 using the secondary antenna 154 when the pointing error of the primary antenna 152 to the target satellite 110, due to a position of the aircraft 102 relative to the target satellite 110, reaches a threshold. In doing so, the antenna system 150 can provide communication with the target satellite 110 at geographic locations where use of the primary antenna 152 is precluded due to pointing accuracy limitations of the primary antenna 152. As a result, the techniques described herein can ensure link requirements are satisfied between the aircraft 102 and the target satellite 110.

When using the primary antenna 152 to communicate with the target satellite 110, the antenna selection system 200 can switch to communicating with the second target satellite 115 using the secondary antenna 154 when the distance between the primary antenna 152 and the target satellite 110, due to respective velocities and trajectories of the aircraft 102 and target satellite 110, reaches a threshold. In doing so, the antenna system 150 can provide for a seamless handover of communications from the target satellite 110 to the second target satellite 115. As a result, the techniques described herein can support handover that occurs with minimal, to no, packet loss when communications are handed over from one target satellite to another target satellite.

The secondary antenna 154 can include an array of antenna elements and a steering mechanism for pointing a main beam of the array at the target satellite 110 as the aircraft 102 moves. The secondary antenna 154 can be a different type of antenna than the primary antenna 152, and/or have a different beam steering mechanism than the primary antenna 152.

The steering mechanism for the secondary antenna 154 can include a positioner rotatably coupled to the array of the secondary antenna 154 to mechanically steer the array about at least one axis to point the main beam of the array of the secondary antenna 154 at the target satellite 110 as the aircraft 102 moves. In some examples, the secondary antenna 154 is mechanically steered using a one-axis positioner. For example, the secondary antenna 154 may have a fixed elevation angle and may have an azimuth positioner. Alternatively, the secondary antenna may have a single axis positioner that steers the array in the elevation axis. In some examples, the secondary antenna 154 is mechanically steered using a two-axis positioner (e.g., an elevation-over-azimuth (EL/AZ) positioner, a two-axis tilt positioner). In some cases, a range of one or more of the axes of the positioner may be limited. For example, the positioner may have less than 90 degrees of range for an elevation axis of the secondary antenna 154. In some cases, the mid-point of the range for the elevation axis may be less than 45 degrees from the axis of the azimuth positioner. In one example, the mid-point of the range for the elevation axis may be parallel to the axis of the azimuth positioner (e.g., a mid-point of the range for the elevation axis may point the boresight of the secondary antenna 154 along the axis of the azimuth positioner). In some cases, the range of the elevation angle of the secondary antenna may be 30 or 20 degrees, or the range may be ±20 or ±30 degrees. In some cases, the range of elevation angles available to the secondary antenna 154 may be based on an aperture thickness for the secondary antenna and an available area in the aerodynamic radome 156. In some cases, the available area in the aerodynamic radome 156 for the secondary antenna 154 is less than the available area for the primary antenna 152. In some cases, the secondary antenna 154 may be rectangular in shape and a thickness of an aperture of the secondary antenna 154 may be smaller than a length of the aperture.

As described in more detail below, the secondary antenna 154 is arranged differently relative to the primary antenna 152, and has different composite beamwidth characteristics versus skew angle than the primary antenna 152 at various geographic locations, such that the secondary antenna 154 can provide an acceptable service area for communication with target satellite 110 that is different than the acceptable service area provided by the primary antenna 152. In some examples, a beamwidth along the vertical axis of the secondary antenna 154 is smaller than a beamwidth along the vertical axis of the primary antenna 152.

Thus, at a given geographic location that is within the acceptable service area of the secondary antenna 154 and also outside the acceptable service area of the primary antenna 152, the secondary antenna 154 can satisfy interference requirements with the non-target satellite 120. In other words, switching to the secondary antenna 154 can reduce interference with the non-target satellite 120 as compared to the primary antenna 152, while still permitting communication between the aircraft 102 and the target satellite 110. In doing so, the secondary antenna 152 can provide for communication with the target satellite 110 at geographic locations where use of the primary antenna 152 is precluded due to interference requirements.

At some or all of geographic locations for the aircraft 102, the primary antenna 152 may be designed to provide better performance characteristics than the secondary antenna 154 for communicating at least one of the return uplink signal 116 and the forward downlink signal 114 with the target satellite 110. For example, the primary antenna 152 can have one or more of higher gain, lower sidelobes, cross-polarization, etc.

As used herein, the interference "with" non-target satellite 120 can be uplink interference and/or downlink interference. Uplink interference is interference to the non-target satellite 120 caused by electromagnetic energy from a portion of the return uplink signal 116 that is received by the non-target satellite 120. Downlink interference is interference to the antenna system 150 caused by radiated electromagnetic energy from the non-target satellite 120 that is received by the antenna system 150. The downlink interference can increase the equivalent noise temperature at a receiver of the antenna system 150, which in turn reduces the signal-to-noise ratio of the forward downlink signal 114 received by the antenna system 150.

The antenna selection system 200 can switch between the primary antenna 152 and the secondary antenna 154 based one or more thresholds for the amount of interference with the non-target satellite 120. The one or more thresholds can be based on uplink interference and/or downlink interference and can vary from example to example.

In some examples, the same threshold can be used for switching from the primary antenna 152 to the secondary antenna 154, and for switching from the secondary antenna 152 to the primary antenna 152. In other words, the antenna selection system 200 can switch from the primary antenna 152 to the secondary antenna 154 when the amount of interference reaches the threshold and switch back to the primary antenna 152 when the amount of interference using the primary antenna 152 will be below the threshold. In some other examples, the threshold for switching from the primary antenna 152 to the secondary antenna 154 can be different than the threshold for switching from the secondary antenna 154 to the primary antenna 152. In such a case, the antenna selection system 200 can avoid rapidly switching between the antennas 152, 154 when the aircraft 102 is near the boundary of the acceptable service area of the primary antenna 152.

In some examples, the value of the threshold for switching transmission of the return uplink signal 116 from the primary antenna 152 to the secondary antenna 154 can for example be based on regulatory requirements imposed by regulatory agencies (e.g., FCC, ITU, etc.) on the maximum power spectral density (or other metric) that can be radiated to the non-target satellite 120, or coordination agreements with the operator of the non-target satellite 120. Additionally, the threshold for switching transmission of the return uplink signal 116 from the primary antenna 152 to the secondary antenna 154 can account for one or more of motion induced pointing accuracy limitations of the primary antenna 152, etc.

The antenna selection system 200 can determine when to switch based on a comparison(s) of the threshold(s) to the amount of interference with the non-target satellite 120 at the current geographic location and attitude of the aircraft 102. The current geographic location may for example be provided via a global positioning system (GPS) or other equipment on the aircraft 102. The attitude (including yaw, roll and pitch) of the aircraft 102 may for example be provided via an internal reference unit (IRU) on the aircraft 102.

The amount of interference at a given geographic location can be determined using various techniques and can be characterized or represented in different ways. For example, in some examples the amount of interference is represented in terms of power spectral density (PSD).

The amount of uplink interference can for example be determined based on one or more of the known antenna pattern characteristics of the primary antenna 152 and the secondary antenna 154, the transmission parameters (e.g., transmit power, frequency range, etc.) of the return uplink signal 116, the geographic location of the aircraft 102, the attitude of the aircraft 102, the locations of the target satellite 110 and non-target satellite 120, the operating frequency, system gain-to noise temperature (G/T) and/or polarization of operation of the non-target satellite 120, etc. Alternatively, other and/or additional information can be used to calculate the amount of interference. The amount of downlink interference can be calculated in a similar manner based on the parameters of a signal from the non-target satellite 120 that is received by the antenna system 150.

In some examples, the comparison of the threshold(s) to the amount of interference at the various geographic locations has been previously calculated for each of the primary antenna 152 and the secondary antenna 154. In such a case, the antenna selection system 200 can store a look-up table indicating which of the primary antenna 152 and secondary antenna 154 to use based on the current geographic location and attitude of the aircraft 102.

As described herein, the primary antenna 152 and secondary antenna 154 may be configured to provide different acceptable service areas based on an arrangement of the secondary antenna 154 different than the primary antenna 152. Thus, at a given geographic location that is within the acceptable service area of the secondary antenna 154 and also outside the acceptable service area of the primary antenna 152, the secondary antenna 154 can satisfy pointing accuracy requirements with the target satellite 110. For example, switching to the secondary antenna 154 can reducing pointing errors for communicating with the target satellite 110 as compared to the primary antenna 152. In doing so, the secondary antenna 152 can provide for communication with the target satellite 110 at geographic locations where use of the primary antenna 152 is degraded or precluded to pointing accuracy limitations of the primary antenna 152—e.g., when antenna system 150 is located in or near a sub-satellite position of the target satellite 110.

In some examples, a pointing accuracy of the secondary antenna 154 may be greater than a pointing accuracy of a primary antenna 154 based on a geographic location of the aircraft 102 relative to the target satellite 110. In some cases, the secondary antenna 154 may provide a superior pointing accuracy when the aircraft 102 is located in a sub-satellite position of the target satellite 110. Put another way, the secondary antenna 154 may have a superior pointing accuracy when the target satellite 110 is located directly (or nearly directly) above the aircraft 102. When the aircraft 102 is located in a sub-satellite position of target satellite 110, the aircraft 102 may be referred to as being in a "keyhole" region. While located in the keyhole region, a slew rate of the primary antenna 152 may increase rapidly. That is, relatively small changes in the position of the target satellite 110 relative to the aircraft 102 (e.g., due to aircraft movement, roll, pitch, or yaw) may result in relatively large changes in an angle (e.g., an azimuth angle) of the positioner of the primary antenna 152 to maintain the boresight of the primary antenna 152 pointed at the target satellite. These adjustments to the positioning of the primary antenna 152 may occur over a short period of time to maintain the quality of the communication link such that a slew rate of the positioner angle (e.g., the change in the angle over time) may be similarly large. In some cases, the positioner of the primary antenna 152 may have a limited slew rate and be unable to provide the increased slew rate to maintain a pointing error of the primary antenna 152 to the target satellite 115 below a threshold while the aircraft is in the keyhole region. In other words, limitations (e.g., slew rate) of the positioner of the primary antenna may result in pointing error (e.g., an average pointing error) that may exceed a pointing error threshold when an axis of the positioner is at certain pointing angles (e.g., pointing near or directly overhead).

Additionally, or alternatively, the secondary antenna 154 may provide a superior pointing accuracy when a positioning of the aircraft 102 causes the target satellite 110 to leave a field of view of the primary antenna 152. That is, in some cases, a target satellite 110 may exit a field of view of the primary antenna 152 increasing a pointing error between the primary antenna 152 and the target satellite 110. In such cases, due to being differently arranged than the primary antenna 152, a pointing error of the secondary antenna 154 may be less than the pointing error of the primary antenna 152 for certain positioning of the aircraft 102 relative to the target satellite 110.

The antenna selection system 200 can switch between the primary antenna 152 and the secondary antenna 154 based on one or more thresholds associated with a level of pointing accuracy to the target satellite 110. The one or more thresholds can be based on relative positioning of the aircraft 102 to the target satellite 110, slew rates, pointing error, and/or field of view and can vary from example to example.

In some examples, the same threshold can be used for switching from the primary antenna 152 to the secondary antenna 154, and for switching from the secondary antenna 152 to the primary antenna 152. In other words, the antenna selection system 200 can switch from the primary antenna 152 to the secondary antenna 154 when a pointing accuracy of the primary antenna 152 fails to satisfy the threshold and switch back to the primary antenna 152 when the pointing accuracy of the primary antenna 152 satisfies the threshold. In some other examples, the threshold for switching from the primary antenna 152 to the secondary antenna 154 can be different than the threshold for switching from the secondary antenna 154 to the primary antenna 152. In such a case, the antenna selection system 200 can avoid rapidly switching between the antennas 152, 154 when the aircraft 102 is near the boundary of the acceptable service area of the primary antenna 152.

In some examples, the antenna selection system 200 may determine when to switch based on a current or predicted location of the target satellite 110 relative to the aircraft 102—e.g., based on determining that a current location of the aircraft 102 is located within a keyhole region of the target satellite 110 or that a future location of the aircraft 102 will be location within the keyhole region. The antenna selection system 200 may use GPS information for the aircraft 202 and/or target satellite 110 to determine a current geographic location of the target satellite 110 relative to the aircraft 102. Additionally, or alternatively, the antenna selection system 200 may use trajectory information for the aircraft 102 and/or the target satellite 110 to determine a predicted geographic location of the target satellite 110 relative to the aircraft 102.

In some examples, the antenna selection system 200 may determine when to switch based on an attitude (e.g., roll, pitch, and yaw) of the aircraft 102. For example, the antenna selection system 200 may switch to the secondary antenna 154 based on determining that a banking angle of the aircraft 102 is or will lead to a pointing accuracy of the primary antenna 152 that is below the threshold.

In some examples, antenna selection system 200 may determine when to switch based on a metric of a slew rate of the primary antenna 152. In some examples, the metric may be a rate of change of azimuth angle of the primary antenna as the positioner of the primary antenna 152 tracks the target satellite 110. Thus, the antenna selection system 200 may determine when to switch based on a rate of change of an azimuth angle of the primary antenna 152. For example, the antenna selection system may switch to the secondary antenna 154 based on determining that a rate of change of the azimuth angle has exceeded a threshold. In some examples, the antenna selection system 200 may determine when to switch based on an elevation angle of the primary antenna 152. For example, the antenna selection system may switch to the secondary antenna 154 based on determining that an elevation angle has exceeded a threshold.

In some examples, the antenna selection system 200 may determine when to switch based on a pointing error of the primary antenna 152. For example, the antenna selection system 200 may determine when to switch based on a pointing error of the primary antenna 152 to a target satellite 110 exceeding a threshold—e.g., when the target satellite 110 is outside a field of view of the primary antenna 152.

In some examples, the antenna selection system 200 may determine when to switch based on field of view of the primary antenna 152. For example, the antenna selection system 200 may switch to the secondary antenna 154 based on determining that a positioning of the aircraft 152 has caused, or is likely to cause, the target satellite 110 to leave a field of view of the primary antenna 152.

When using the primary antenna 152 to communicate with the target satellite 110, the antenna selection system 200 can switch to communicating with the target satellite 110 or the second target satellite 115 using the secondary antenna 154 when a performance characteristic for communicating with the target satellite 110 via the primary antenna 152 reaches, due to transmission range limitations, a threshold. In doing so, the antenna system 150 can provide efficient handover from the target satellite 110 to the second target satellite 115 as the aircraft 102 exits a transmission range of the primary antenna 152 with the target satellite 110. As a result, the techniques described herein can ensure that handover of communications from the target satellite 110 to the second target satellite 115 may be performed without, or with minimal, data interruptions.

As described herein, the primary antenna 152 and secondary antenna 154 may be independently positioned to point at different areas. Thus, at a given geographic location where communications conditions between the primary antenna 152 and the target satellite 110 are failing, communication conditions between the secondary antenna 154 and the second target satellite 115 may be satisfied. In other words, switching to the secondary antenna 154 can establish a connection with the second target satellite 115 that has an increased performance characteristics as compared to the connection between the primary antenna 152 and the target satellite 110. In doing so, communications can be handed over from the target satellite 110 to the second target satellite 115 without, or with minimal, data interruptions. In some examples, the secondary antenna 154 may be used to communicate with the second target satellite 115 while the primary antenna 152 is repositioned to point at the second target satellite 115.

The antenna selection system 200 can switch between the primary antenna 152 and the secondary antenna 154 based on one or more thresholds for handing over communications from the target satellite 110 to the second target satellite 115. The one or more thresholds can be based on a trajectory, pointing accuracy, and/or a transmission range of the primary antenna 152 and can vary from example to example.

In some examples, the antenna selection system 200 may determine when to switch based on a current or predicted geographic location of the target satellite 110 relative to the aircraft 102. For example, the antenna selection system 200 may switch to the secondary antenna 154 based on determining that aircraft 102 is exiting an acceptable service area for communications between the aircraft 102 and the target satellite 110 via the primary antenna 152, or vice versa. In some examples, the antenna selection system may switch to the secondary antenna 154 based on determining that a distance between the aircraft 102 and the target satellite 110 has exceeded a threshold. In some cases, a boundary of the acceptable service area of the primary antenna 152 is based on an upper limit of the transmission range of the primary antenna 152. In some cases, the antenna selection system 200 uses trajectory information for the aircraft 102 and/or the target satellite 110 to determine a predicted geographic location of the target satellite 110 relative to the aircraft 102.

In some examples, the secondary antenna 154 may be a phased array antenna and may be capable of electronically steering a transmission or reception beam in multiple dimensions. In such cases, the secondary antenna 154 may be able to steer a beam to avoid interference with a non-target satellite (e.g., create a null beam in a direction of a non-target satellite0. In such cases, the determination of whether to switch to the secondary antenna 154 may depend on a proximity of a target satellite with a non-target satellite. For example, where one or more of the target or non-target satellites are non-geostationary (e.g., LEO, MEO), the antenna selection system 200 may determine to use the secondary antenna 154 (e.g., with appropriate beam phasing to create a null beam in the direction of the non-target satellite). when the target and non-target satellites are within an angular threshold of each other from the perspective of the aircraft 102.

The manner in which the antenna selection system 200 controls the switching between the primary antenna 152 and the secondary antenna 154 can vary from example to example. In some examples, the antenna selection system 200 provides control signals to the transceiver 210 (or transceivers) to enable/disable operation of electronics associated with the primary antenna 152 and the secondary antenna 154. In other examples, the antenna selection system 200 controls switches that route the signals between the modem 230 and the antennas 152, 154 through the transceiver 210. Alternatively, other techniques can be used.

In some examples, the antenna selection system 200 switches both the transmission of return uplink signal 116 and the reception of forward downlink signal 114 when switching between the primary antenna 152 and the secondary antenna 154. In such a case, the same antenna (either primary antenna 152 or the secondary antenna 154) is used for transmitting the return uplink signal 116 and for receiving the forward downlink signal 114 at a particular time during operation.

In some other examples, the antenna selection system 200 switches only one of the transmission of return uplink signal 116 and the reception of forward downlink signal 114 when switching between the primary antenna 152 and the secondary antenna 154. For example, in examples in which the switching is done to avoid excessive uplink interference with the non-target satellite 120, the primary antenna 152 can be used to receive forward downlink signal 114 regardless of whether the return uplink signal 116 is transmitted via the primary antenna 152 or the secondary antenna 154. In doing so, overall system performance can be improved in examples in which downlink interference is not excessive and the primary antenna 152 can provide better performance characteristics (e.g., higher gain, etc.) than the secondary antenna 154 for reception of the forward downlink signal 114. Using the secondary antenna 154 only for transmission of the return uplink signal 116 may simplify the secondary antenna 154 and the associated electronics. For example, the secondary antenna 154 may be operable over the frequency range of the return uplink signal 116, but not the frequency range of the forward downlink signal 114. In examples in which the primary antenna 152 is coupled to a dedicated transceiver, the secondary antenna 154 can be coupled to a transmitter rather than another transceiver. As another example, the primary antenna 152 may be coupled to a receiver, and a shared transmitter may be selectively switched between the primary antenna 152 and the secondary antenna 154.

In addition to switching between the primary antenna 152 and the secondary antenna 154, the antenna selection system 200 can also change the transmission parameters of the return uplink signal 116 to avoid excessive interference when needed. For example, the antenna selection system 200 can change one or more of transmitted power level of the return uplink signal 116, spreading the return uplink signal 116 over a larger bandwidth, or any other technique for reducing the power spectral density in the direction of the non-target satellite 120.

In some examples, the primary antenna 152 and the secondary antenna 154 each remain pointed at the target satellite 110 regardless of which antenna 152, 154 is currently being used. In other words, the antenna system 150 maintains pointing of the primary antenna 152 and the secondary antenna 154 at the target satellite 110 following switching of the communication with the target satellite 110. In such a case, the handover time between the primary antenna 152 and the secondary antenna 154 can be minimized.

In some examples, the primary antenna 152 may be pointed at the target satellite 110 and the secondary antenna 154 may be pointed at the second target satellite 115. After communications are handed over to the second target satellite 115 (via the secondary antenna 154), the primary antenna may be maneuvered to point at the second target satellite 115, and the antenna selection system 200 may switch back to the primary antenna 152. In some cases, the primary antenna 152 completes a positioner adjustment of the azimuth axis or elevation axis and releases its link with the target satellite 110 while locking onto the second target satellite 115 and before the antenna selection system switches back to the primary antenna 152.

In some examples, the antenna system 150 maintains the return link operating point (e.g., energy per symbol to noise power spectral density $E_s/N_0$) regardless of whether the primary antenna 152 or the secondary antenna 154 is used to transmit the return uplink signal 116. For example, in examples in which the gain of the primary antenna 152 is greater than the gain of the secondary antenna 154, the antenna system 150 may increase the transmit power of the return uplink signal 116 upon switching from the primary antenna 152 to the secondary antenna 154. The antenna system 150 may then reduce the transmit power upon switching back to the primary antenna 152. In some alternative examples, the antenna system 150 can have different return link operating points for the primary antenna 152 and the secondary antenna 154. The different operating points can be due to differences in the gains of the primary antenna 152 and the secondary antenna 154, and/or different transmit powers of the return uplink signal 116 when using the primary antenna 152 and the secondary antenna 154.

Figure 2B:
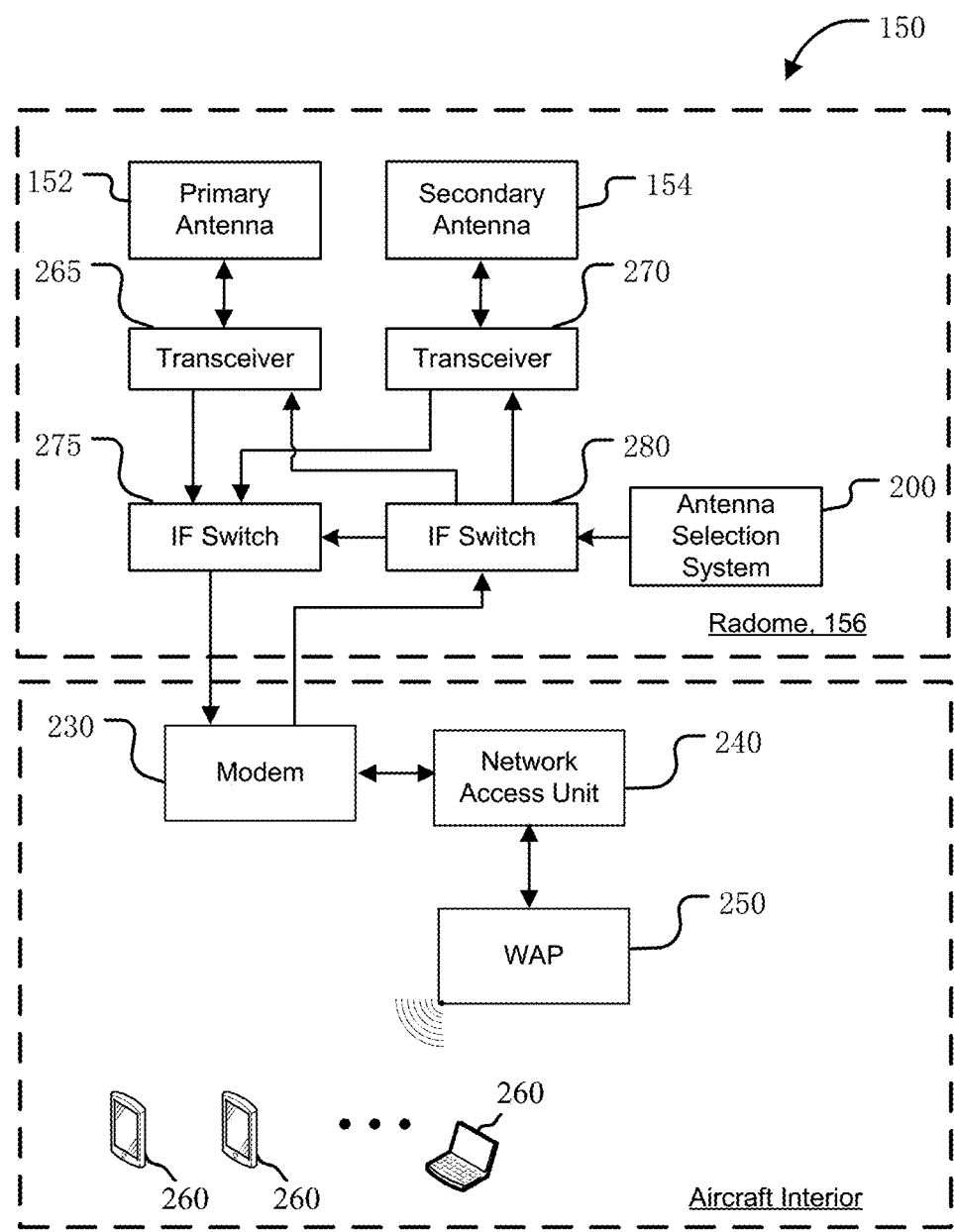

FIG. 2B is a block diagram illustrating an example antenna system 150 on the aircraft 102 of FIG. 1. The antenna system 150 can include primary antenna 152, secondary antenna 154, antenna selection system 200, modem 230, NAU 240, WAP 250, primary transceiver 265, secondary transceiver 270, first intermediate frequency (IF) switch 275, and second IF switch 280.

The primary antenna 152 may be coupled with the primary transceiver 265 and the secondary antenna 154 may be coupled with the secondary transceiver 270. In some cases, a first radio frequency (RF) signal is communicated between the primary antenna 152 and the primary transceiver 265, and a second RF signal is communicated between the secondary antenna and the secondary transceiver 270. In some examples, the first RF signal is generated based on a signal transmitted from a target satellite 110 that is received at the primary antenna 152, and the second RF signal is generated based on the signal transmitted from the target satellite 110 that is received at the secondary antenna 154. In some examples, the first RF signal is generated by the primary transceiver 265, and the second RF signal is generated by the secondary transceiver 270 for transmission to a target satellite 110.

For the forward downlink signal 114, the primary transceiver 265 may downconvert an RF signal received by the primary antenna 152 to a first receive (Rx) IF signal, and the secondary transceiver 270 may downconvert an RF signal received from the secondary antenna 154 to a second Rx IF signal. The primary transceiver 265 may send the first Rx IF signal to the first IF switch 275, and the secondary transceiver 270 may send the second Rx IF signal to the first IF switch 275. In some examples, the first IF switch 275 may be configured to switch between IF signals that are generated from RF signals received at the primary antenna 152 and the secondary antenna 154. And the second IF switch 280 may be configured to switch between IF signals that are generated by the modem 230 for transmission over the primary antenna 152 and the secondary antenna 154.

In some examples, the first IF switch 275 may receive the first Rx IF signal from the primary transceiver 265 and the second Rx IF signal from the secondary transceiver 270. In some cases, the first IF switch 275 may pass the first Rx IF signal to the modem 230 and prevent the second Rx IF signal from being passed to the modem 230, or vice versa. In some cases, first IF switch 275 may include multiple switching components, where a first switching component may be configured to couple the first Rx IF signal received over the primary antenna 152 and downconverted by the primary transceiver 265 with the modem 230, and a second switching component may be configured to couple the second Rx IF signal received over the secondary antenna 154 and downconverted by the secondary transceiver 270 with the modem 230.

In some examples, the antenna selection system 200 may control which of the received Rx IF signals are passed to the modem 230. In some examples, the antenna selection system 200 may pass the first Rx IF signal received from the primary transceiver 265 to the modem 230—e.g., based on determining that an aircraft is within a first acceptable service area of the primary antenna 152. Alternatively, the antenna selection system 200 may pass the second Rx IF signal received from the secondary antenna 154 to the modem 230—e.g., based on determining that an aircraft is within a second acceptable service area of the secondary antenna 154, or not within the first acceptable service area. By using IF switches, the antenna selection system 200 may switch between the primary antenna 152 and the secondary antenna 154 at a faster rate than if RF switches were used. For example, RF switches may be low loss waveguide mechanical switches and may be slower than solid state switches which may be used for the first IF switch 275 and second IF switch 280. Although the solid state switches used for the first IF switch 275 and second IF switch 280 may have higher loss than waveguide mechanical switches, the G/T and Equivalent Isotropically Radiated Power (EIRP) is established by the primary transceiver 265 and secondary transceiver 270, and thus the loss incurred in the first IF switch 275 and second IF switch 280 may not substantially impact performance.

In some examples, the antenna selection system 200 may be configured to switch between the primary antenna 152 and the secondary antenna 154 in a manner that maintains a connection with a target satellite 110. The primary antenna 152 and the secondary antenna 154 may concurrently receive a signal from a target satellite 110. The primary antenna 152 may generate a first RF signal based on receiving the signal from the target satellite 110, and the secondary antenna 154 may concurrently generate a second RF signal based on receiving the signal from the target satellite 110. The primary antenna 152 may send the first RF signal to primary transceiver 265, which may convert the RF signal to a first Rx IF signal. Concurrently, the secondary antenna 154 may send the second RF signal to the secondary transceiver 270, which may convert the signal to a second Rx IF signal. The primary transceiver 265 may send the first Rx IF signal to the first Rx IF switch 275, and the secondary transceiver 270 may send the second Rx IF signal to the first Rx IF switch 275. The first IF switch 275 switch may pass one of the IF signals to the modem 230, preventing the other IF signal from being passed to the modem 230.

The antenna selection system 200 may determine which of the first Rx IF signal or the second Rx IF signal is passed to the modem 230. In some cases, the antenna selection system 200 may send an activation signal to the first IF switch 275 that activates a first switching component that is coupled with the primary transceiver 265 while the aircraft is within a first acceptable service area of the primary antenna 152. In some cases, the antenna selection system 200 also sends a deactivation signal to the first IF switch 275 that deactivates a second switching component that is coupled with the secondary transceiver 270. In some cases, the first switching component is configured to be operated complementary to the second switching component, and a signal that activates the first switching component may deactivate the second switching component. Thus, the first IF switch 275 may pass the IF signal received from the primary antenna 152 to the modem 230 when an activation signal is received from the antenna selection system 200.

As the aircraft moves along a flight path, the antenna selection system 200 may determine to switch to the secondary antenna 154 (e.g., based on a performance characteristic associated with the primary antenna 152, such as interference to a non-target satellite 120). The antenna selection system 200 may send a signal to the first IF switch 275 to pass the second Rx IF signal received from the secondary antenna 154 to the modem 230. And as the aircraft returns, or is predicted to return, to the first acceptable service area, the antenna selection system 200 may send a signal to the first IF switch 275 to again pass the first Rx IF signal received from the primary antenna 152 to the modem 230.

The switching of the first IF switch 275 may be independent of the communications performed by the modem 230 with the target satellite 110. That is, the antenna selection system 200 may send the signals to the first IF switch 275 without synchronizing or otherwise scheduling the signals according to the communications performed by the modem 230. Alternatively, the switching of the first IF switch 275 may be synchronized to a frame timing of the modem 230, but otherwise independent of the modem 230 (e.g., the modem 230 may not receive an indication of the switching and may not adapt communications based on the switching). Switching the source of the IF signal sent to the modem 230 between the first Rx IF signal and the second Rx IF signal may result in one or more dropped packets (e.g., if the switching occurs in the middle of a packet transmission), which may be recovered by the modem via a handshake or error-control protocol (e.g., automatic repeat request (ARQ), transmission control protocol (TCP)), or may be dropped if a protocol not employing handshaking or error-control is used (e.g., user datagram protocol (UDP)).

For the return uplink signal 116, the antenna selection system 200 may similarly send activation and deactivation signals to the second IF switch 280 for transmitting communications from the aircraft to a target satellite 110. In some cases, a single activation and deactivation signal is sent to both the first IF switch 275 and the second IF switch 280. In other cases, separate activation and deactivation signals are sent to the first IF switch 275 and the second IF switch 280. In some cases, frame timing for downlink and uplink signals may be different (e.g., to account for transmission delay), and thus if switching of the first IF switch 275 and the second IF switch 280 is synchronized to frame timing, the switching of the first IF switch 275 and the second IF switch 280 may occur at different times.

In some examples, the antenna selection system 200 may be similarly configured to switch between the primary antenna 152 and the secondary antenna 154 during a handover procedure. In such cases, the secondary antenna 154 may be aimed at an approaching second target satellite 115 while the primary antenna 152 remains aimed at a current target satellite 110. Thus, the primary antenna 152 may generate a first RF signal based on a first signal received from the current target satellite 110, and the secondary antenna 154 may generate a second RF signal based on a second signal received from the approaching second target satellite 115. Also, the primary transceiver 265 may generate a first Rx IF signal, and the secondary transceiver 270 may generate a second Rx IF signal.

While, the current target satellite 110 is within a transmission range of the primary antenna 152, the antenna selection system 200 may set the first IF switch 275 to pass the first Rx IF signal to the modem 230. As the connection between the primary antenna 154 and the current target satellite 110 deteriorates or is expected to deteriorate, the antenna selection system 200 may set the first IF switch 275 to pass the second Rx IF signal to the modem 230. For handover from a current target satellite 110 to a second, different target satellite 115, switching of the first IF switch 275 may be controlled by the modem 230, or may be independent of the modem 230. For example, in some cases the modem 230 may determine that the connection to the current target satellite 110 is deteriorating and indicate to the antenna selection system 200 to set the first IF switch 275 to pass the second Rx IF signal to the modem 230 at a particular time. Alternatively, antenna selection system 200 may determine to switch to the secondary antenna 154 independently of modem 230 (e.g., based on signal characteristics of the RF or IF signals). In some cases, the current target satellite 110 and second target satellite 115 may transmit the same data (e.g., the same packets at the same time), and thus the techniques described above may be used by modem 230 to recover or drop any lost packets. Alternatively, modem 230 may determine that the connection to the current target satellite 110 was dropped and may establish a connection to the second target satellite 115 after switching of the first IF switch 275.

After switching the IF signals from the primary antenna to the secondary antenna, the primary antenna 152 may be aimed at the approaching second target satellite 115. In some cases, the procedure for aiming the primary antenna 152 at the approaching second target satellite 115 may be referred to as "retracing." Once the primary antenna 152 has repositioned in the direction of the approaching second target satellite 115, the primary antenna 152 may generate the first RF signal based on the signal being transmitted from the second target satellite 115, and the primary transceiver 265 may generate the first Rx IF signal based on the first RF signal received from the second target satellite 115. Also, the antenna selection system 200 may set the first IF switch 275 to again pass the first Rx IF signal to the modem 230. The switching back to the first Rx IF signal may occur according to the techniques discussed above (independent of the modem 230, according to the frame timing of the modem 230). By switching between concurrently received Rx IF signals, communications may be handed over from a current target satellite 110 to a second target satellite 115 without the modem 230 reestablishing a connection when returning to the primary antenna 152 after retracing, and without, or with minimal, packet loss during the switching operation.

For the return uplink signal 116, the antenna selection system 200 may similarly control the second IF switch 280 for transmitting communications from the aircraft to different target satellites during a handover procedure. In some cases, a single control signal is sent to both the first IF switch 275 and the second IF switch 280. In other cases, separate control signals are sent to the first IF switch 275 and the second IF switch 280.

Figure 2C:
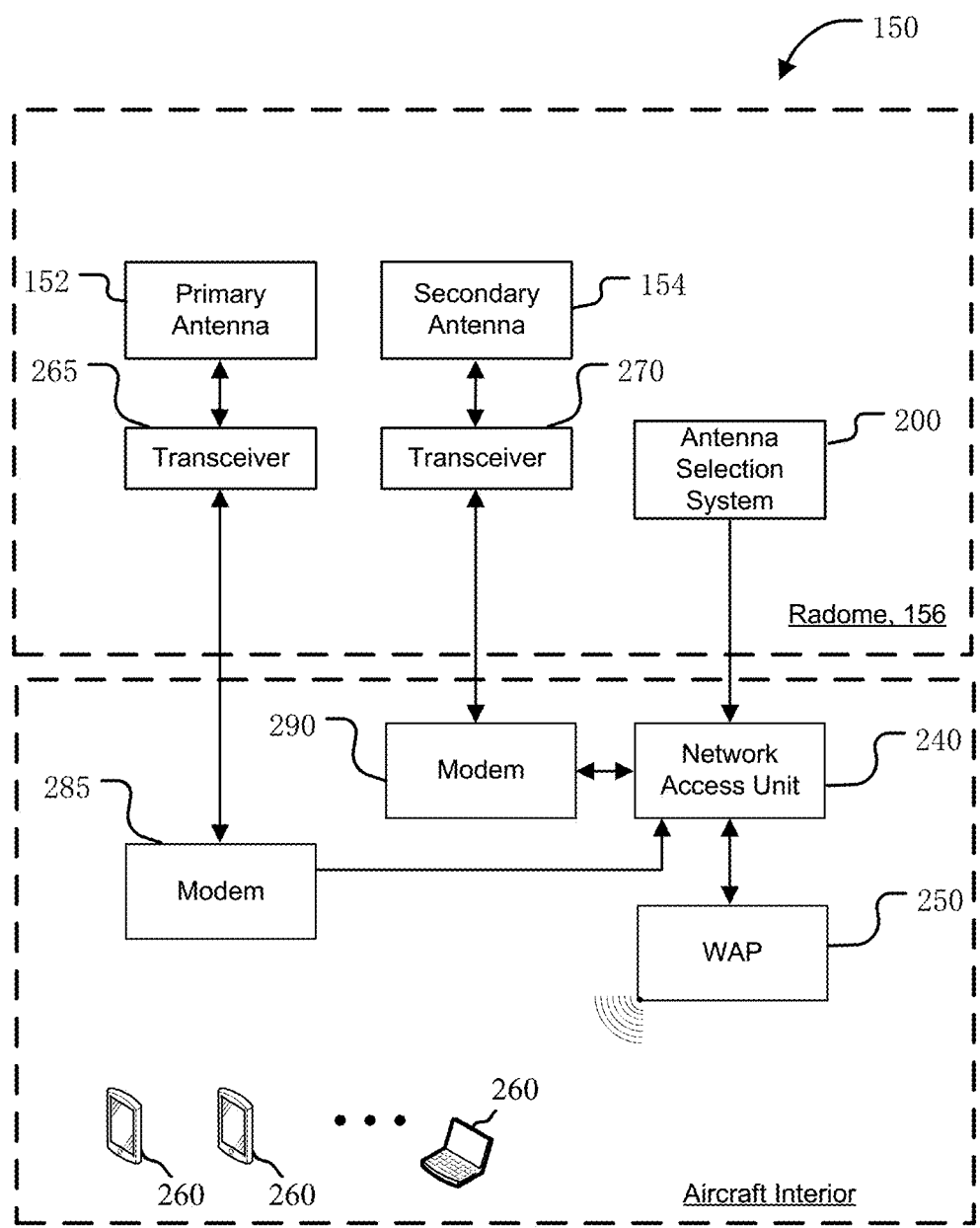

FIG. 2C is a block diagram illustrating an example antenna system 150 on the aircraft 102 of FIG. 1. The antenna system 150 can include primary antenna 152, secondary antenna 154, antenna selection system 200, modem 230, NAU 240, WAP 250, primary transceiver 265, secondary transceiver 270, primary modem 285, and secondary modem 290.

The primary antenna 152 may be coupled with the primary transceiver 265 and the secondary antenna 154 may be coupled with the secondary transceiver 270. In some cases, the primary antenna 152 passes a first RF signal to the primary transceiver 265 and the secondary antenna 154 passes a second RF signal to the secondary transceiver 270. In some examples, the first RF signal is generated based on a signal transmitted from a target satellite 110 that is received at the primary antenna 152, and the second RF signal is generated based on the signal transmitted from the target satellite 110 that is received at the secondary antenna 154. In some examples, the first RF signal is generated by the primary transceiver 265, and the second RF signal is generated by the secondary transceiver 270 for transmission to a target satellite 110. In some cases, the example antenna system 150 illustrated in FIG. 2C may be operated in a make before break communication configuration. That is, a connection may be established (e.g., a data stream generated or signal acquisition performed) for the secondary antenna 154 prior to switching from the primary antenna 152 to the secondary antenna, and vice versa.

For the forward downlink signal 114, the primary transceiver 265 may downconvert an RF signal received by the primary antenna 152 to a first Rx IF signal, and the secondary transceiver 270 may downconvert an RF signal received from the secondary antenna 154 to a second Rx IF signal. The primary transceiver 265 may send the first Rx IF signal to the primary modem 285, and the secondary transceiver 270 may send the second Rx IF signal to the secondary modem 290.

In some examples, one of the primary modem 285 or the secondary modem 290 may decode a respective Rx IF signal to generate a data stream—e.g., based on activation and/or deactivation signals received from the antenna selection system 200. In some examples, one of the primary modem 285 or the secondary modem 290 may be deactivated—e.g., after a switching operation is performed.

In other examples, both the primary modem 285 and the secondary modem 290 may decode the respective Rx IF signals and generate data streams based on data extracted from the respective Rx IF signals—e.g., prior to a performance of an operation for switching between the primary antenna 152 and secondary antenna 154. In such cases, a first connection between the primary modem 285 and a target satellite 110 and a second connection between the secondary modem 290 and the target satellite 110 may be established. Thus, the primary modem 285 may send a first data stream to the network access unit 240, and the secondary modem 290 may send a second data stream to the network access unit 240. In some examples, a first connection between the primary modem 285 and a current target satellite 110 and a second connection between the secondary modem 290 and an approaching second target satellite 115 may be established—e.g., prior to a performance of a handover operation.

The NAU 240 may choose between passing the first data stream or the second data stream to the WAP 250. In some examples, the antenna selection system 200 may send a signal to the NAU indicating which of the first data stream or the second data stream is to be passed to the WAP 250. In some examples, the antenna selection system 200 may indicate that the NAU 240 is to pass the first data stream to the WAP 250—e.g., based on determining that an aircraft is within a first acceptable service area of the primary antenna 152. Alternatively, the antenna selection system 200 may indicate that the NAU 240 is to pass the second data stream to the WAP 250—e.g., based on determining that an aircraft is within a second acceptable service area of the secondary antenna 154, or leaving the first acceptable service area.

In some examples, the antenna selection system 200 may be configured to switch between the primary antenna 152 and the secondary antenna 154 in a manner that maintains a connection with a target satellite 110. The primary antenna 152 and the secondary antenna 154 may concurrently receive a signal from a target satellite 110. The primary antenna 152 may generate a first RF signal based on receiving the signal from the target satellite 110, and the secondary antenna 154 may concurrently generate a second RF signal based on receiving the signal from the target satellite 110. In some examples, the primary antenna 152 may send the first RF signal to the primary transceiver 265, and primary transceiver 265 may downconvert the first RF signal to a first Rx IF signal and pass the first Rx IF signal to the primary modem 285. Concurrently, the secondary antenna 154 may send the second RF signal to the secondary transceiver 265, and secondary transceiver 265 may downconvert the second RF signal to a second Rx IF signal and pass the second Rx IF signal to the secondary modem 290.

As the aircraft moves along a flight path, the antenna selection system 200 may determine to switch to the secondary antenna 154 (e.g., based on a performance characteristic associated with the primary antenna 152, such as interference to a non-target satellite 120). In some examples, the antenna selection system 200 may send a signal that activates both the primary modem 285 and the secondary modem 290—e.g., based on identifying a switching scenario. Thus, the primary modem 285 may extract a first data stream from the first Rx IF signal, and the secondary modem 290 may extract a second data stream from the second Rx IF signal. The antenna selection system 200 may determine which data stream of the primary modem 285 or the secondary modem 290 will be passed to the data devices 260. In some cases, the antenna selection system 200 may send a signal to the NAU 240 directing the NAU 240 to select the data stream received from primary modem 285 while the aircraft is within a first acceptable service area of the primary antenna 152.

Thus, the NAU 240 may send the first data stream to the WAP 250. As the aircraft enters, or is predicted to enter, a second acceptable service area of the secondary antenna 154, the antenna selection system 200 may send a signal to the NAU 240 directing the NAU 240 to select the data stream received from the secondary modem 290 while the aircraft is within the second acceptable service area. Thus, the NAU 240 may send the second data stream to the WAP 250. And as the aircraft returns, or is predicted to return, to the first acceptable service area, the antenna selection system 200 may again send a signal to the NAU 240 directing the NAU 240 to select the data stream received from the primary modem 285 while the aircraft is within a first acceptable service area. Thus, the NAU 240 may send the first data stream to the WAP 250. By switching between modems that are concurrently receiving a same data stream, the router may choose between different versions of a data stream while one of the modems reestablishes a connection with the target satellite 110.

In other examples, the antenna selection system 200 may send a signal that activates one of the primary modem 285 and the secondary modem 290 and deactivates the other— e.g., based on identifying a switching scenario. Thus, either the primary modem 285 may extract a first data stream from the first Rx IF signal, or the secondary modem 290 may extract a second data stream from the second Rx IF signal. Whichever of the primary modem 285 and the secondary modem 290 extracts the data stream may pass the data stream to the NAU 240. And the NAU may relay the received data stream to the data devices 260. In some cases, the antenna selection system 200 may send a signal that activates the primary modem 285 and deactivates the secondary modem 290 while the aircraft is within a first acceptable service area of the primary antenna 152.

For the return uplink signal 116, the antenna selection system may similarly send activation and/or or routing indication signals to the primary modem 285, secondary modem 290, and/or NAU 240. In some examples, both the primary modem 285 and secondary modem 290 may be enabled to receive the forward downlink signal 114 while only one of the primary modem 285 or the secondary modem 290 may be enabled for transmission of the return uplink signal 116. Thus, antenna selection system 200 may send separate control signals to the primary modem 285 and the secondary modem 290 to enable downlink and uplink operation. Alternatively, antenna selection system 200 may send control signals to the primary transceiver 265 and secondary transceiver 270 such that both transceivers may be enabled to generate IF signals from the forward downlink signal 114, while only one of the primary transceiver 265 or the secondary transceiver 270 may be enabled for transmission of the return uplink signal 116.

In some examples, the antenna selection system 200 may be similarly configured to switch between the primary antenna 152 and the secondary antenna 154 during a handover procedure. In such cases, the secondary antenna 154 may be aimed at an approaching second target satellite 115 while the primary antenna 152 remains aimed at a current target satellite 110. Thus, the primary antenna 152 may generate a first RF signal based on a signal received from the current target satellite 110, and the secondary antenna 154 may generate a second RF signal based on a signal received from the approaching second target satellite 115. While the current target satellite 110 is within a transmission range or acceptable service area of the primary antenna 152, the antenna selection system 200 may send a signal to the NAU 240 directing the NAU 240 to use the first data stream received from the primary modem 285. Alternatively, the antenna selection system 200 may send a signal that activates the primary modem 285 and deactivates the secondary modem 290 while the current target satellite 110 is within the transmission range or acceptable service area of the primary antenna 152. Thus, the WAP 250 may transmit the first data stream extracted from the first RF signal received from the current target satellite 110 at the primary antenna 152.

As the current target satellite 110 travels or is expected to travel beyond the transmission range or acceptable service area of the primary antenna 152, the antenna selection system 200 may send a signal to the NAU 240 directing the NAU 240 to use the second data stream received from the secondary modem 290. Thus, the WAP 250 may transmit the second data stream extracted from the second RF signal received from the approaching second target satellite 115 at the secondary antenna 154. In some cases, the antenna selection system 200 may send a signal that activates both the primary modem 285 and the secondary modem 290 as the current target satellite 110 travels beyond the reach of the primary antenna 152.

After selecting the second data stream received from the secondary modem 290, the primary antenna 152 may be repositioned to aim at the approaching second target satellite 115. Once the primary antenna 152 has locked onto the approaching second target satellite 115, the antenna selection system 200 may send a signal to the NAU 240 directing the NAU 240 to use the first data stream received from the primary modem 285. Alternatively, the antenna selection system 200 may send a signal that activates the primary modem 285 and deactivates the secondary modem 290 once the primary antenna 152 is pointed toward the approaching second target satellite 115. Thus, a third data stream extracted from a third RF signal received at the primary antenna 152 from the approaching second target satellite 115 may be transmitted by WAP 250. By switching between modems that are concurrently receiving Rx IF signals including a same data stream transmitted from a different target satellite, communications may be handed over from a current target satellite 110 to an approaching second target satellite 115 before (or while) the primary modem 285 establishes a connection with the approaching second target satellite 115.

Figure 3A:
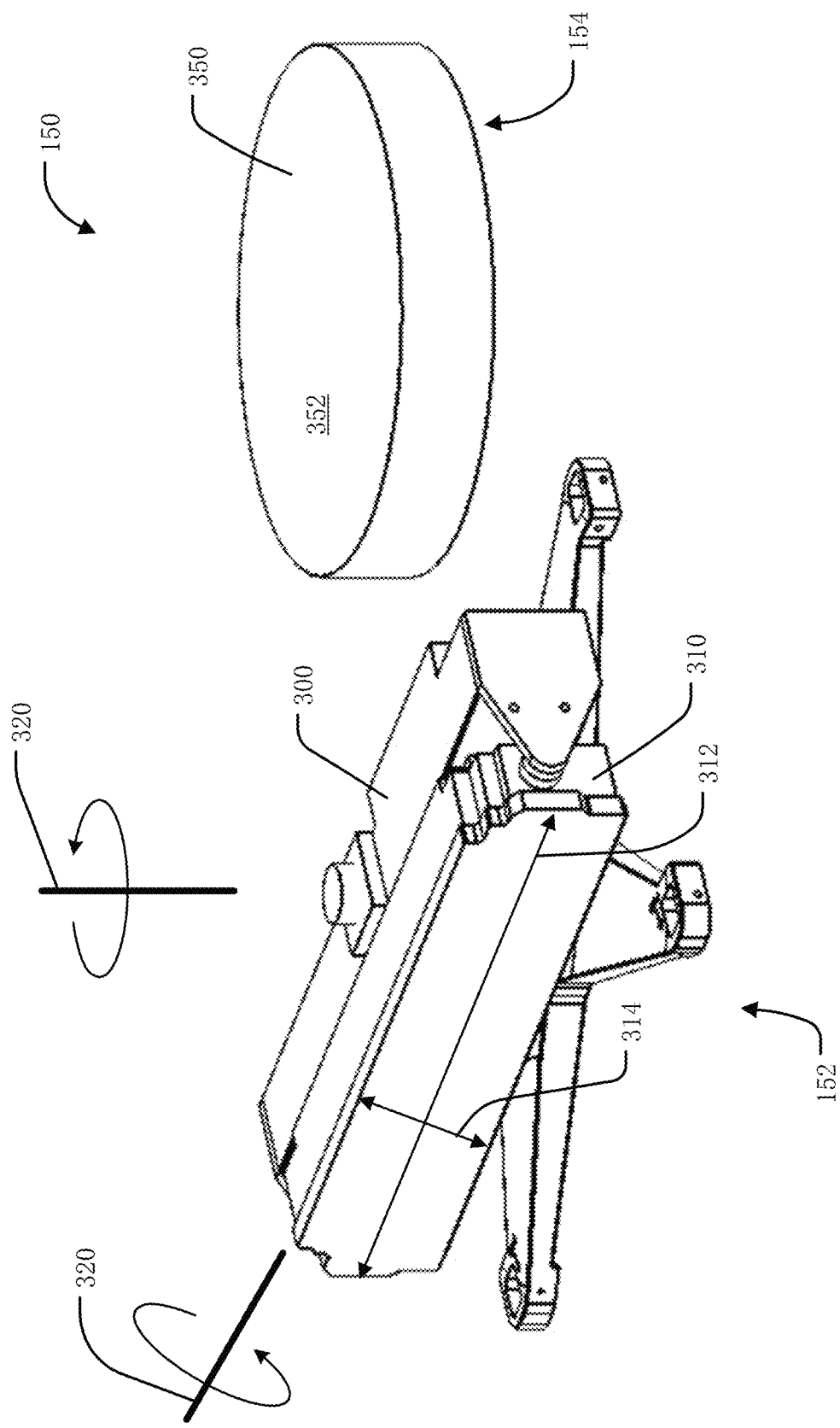
FIG. 3A illustrates a perspective view of an example primary antenna and an example secondary antenna of an example antenna system.

FIG. 3A illustrates a perspective view of an example primary antenna 152 and an example secondary antenna 154 of an example antenna system 150.

The primary antenna 152 can include a positioner 300 and an array 310 of antenna elements. The array 310 of antenna elements has a non-circular aperture that includes a major axis 312 (referred to hereinafter as "horizontal axis 312"), which is the longest line through the center of array 310 of antenna elements. The array 310 of antenna elements that also includes a minor axis (referred to hereinafter as "vertical axis 314"), which is the shortest line through the center of the array 310 of antenna elements. The non-circular aperture of the array 310 of antenna elements defines an antenna beam having an asymmetric antenna beam pattern at boresight.

In the illustrated example, the array 310 of antenna elements is a direct radiating two-dimensional array which results in boresight being normal to a plane containing the antenna elements of the array 310. As a result, in the illustrated example the asymmetric antenna beam pattern has a narrow beamwidth axis aligned with the horizontal axis 312 and a wide beamwidth axis aligned with the vertical axis 314. Alternatively, the array 310 of antenna elements can be arranged and/or fed in a different manner such that boresight is not normal to the plane containing the antenna elements of the array 310.

The positioner 300 is responsive to commands from an antenna control unit (not shown) of the antenna system 150 to mechanically steer the primary antenna 152 to point the main beam of the array 310 in the direction of the target satellite 110. In the illustrated example the positioner 300 is an elevation-over-azimuth (EL/AZ) two-axis positioner that provides full two-axis mechanical steering. The positioner 300 includes a mechanical azimuth adjustment mechanism to move the primary antenna 152 in azimuth 320, and a mechanical elevation adjustment mechanism to move the primary antenna 152 in elevation 320. Each of the mechanical adjustment mechanisms can for example include a motor with gears and other elements to provide for movement of the primary antenna 152 around a corresponding axis. In some alternative examples, the steering mechanism for the primary antenna 152 may include a combination of mechanical and electrical steering of the main beam.

The secondary antenna 154 can include an array 350 of antenna elements having a main beam. The secondary antenna 154 includes a steering mechanism to point the main beam of the array 350 at the target satellite 110. The type of antenna elements, orientation of the antenna elements, and the steering mechanism of the secondary antenna 154 can vary from example to example. In some examples, the array 350 includes antenna elements that are operable over the frequency ranges of both the forward downlink signal 114 and the return uplink signal 116. In such a case, the same antenna elements of the array 350 can transmit the return uplink signal 116 and receive the forward downlink signal 114. In some alternative examples, the array 350 includes a first group of one or more antenna elements to transmit the return uplink signal 116, and a second group of one or more antenna elements to receive the forward downlink signal 114. In examples in which the secondary antenna 154 is only used for transmission of the return uplink signal 116, the antenna of the array 350 may be operable over the frequency range of the return uplink signal 116, but not the frequency range of the forward downlink signal 114.

In the illustrated example, the antenna elements of the array 350 are arranged in a circular two-dimensional array arranged in a plane 352. Alternatively, the antenna elements of the array 350 may be arranged in a different fashion. For example, the array 350 may have a non-circular antenna aperture that results in an asymmetric antenna beam pattern at boresight. In such a case, the asymmetric antenna beam pattern of the secondary antenna 154 has a narrow beamwidth axis and a wide beamwidth axis at boresight. In some examples, the steering mechanism of the secondary antenna 154 includes a mechanical azimuth adjustment mechanism responsive to commands (e.g., from an antenna control unit, the antenna selection system, etc.) to rotate the secondary antenna 154 in azimuth, and an azimuth/elevation adjustment mechanism to steer the main beam of the secondary antenna 154 in the direction of the target satellite. As the aircraft 102 moves, the mechanical azimuth adjustment mechanism can be used to maintain alignment of the narrow beamwidth axis with a line defined by the target satellite 110 and the non-target satellite 120. By aligning the narrow beamwidth axis with that line, the amount of interference with the non-target satellite 120 can be minimized while the secondary antenna 154 is being used.

In the illustrated example, the array 350 is a non-movable, fully electronic scanned phased array antenna. The array 350 can include feed networks and phase controlling devices to properly phase signals communicated with some or all the antenna elements of the array 350 to scan the beam in azimuth and elevation from the normal to the plane 352.

Alternatively, the secondary antenna 154 can include a different steering mechanism, which can vary based on the antenna type of the secondary antenna 154. For example, the secondary antenna 154 can be an electro-mechanically steered array that includes one mechanical scan axis (e.g., single axis tilt positioner) and one electrical scan axis, such as a variably inclined continuous transverse stub (VICTS) antenna. As another example, the secondary antenna 154 can be an offset fed, parabolic cylinder reflector antenna, such as an antenna of the type of DBS-2130 antenna available from L-3 Communications. As yet another example, the secondary antenna 154 can be an EXPLORER 9092H or 9092M antenna available from Cobham, plc.

The combination of the primary antenna 152 and the secondary antenna 154 can vary from example to example. In some examples in which the target satellite 110 operates at Ka-band, the primary antenna 152 is Aero Mobile Terminal Model 2540 available from ViaSat Inc., and the secondary antenna 154 is a ThinAir Falcon-Ka2517 VICTS antenna available from ThinKom. In examples in which the secondary antenna 154 is only used for transmission of the return uplink signal 116, the secondary antenna 154 may only include the transmit antenna aperture of the ThinAir Falcon-Ka2517.

Figure 3B:
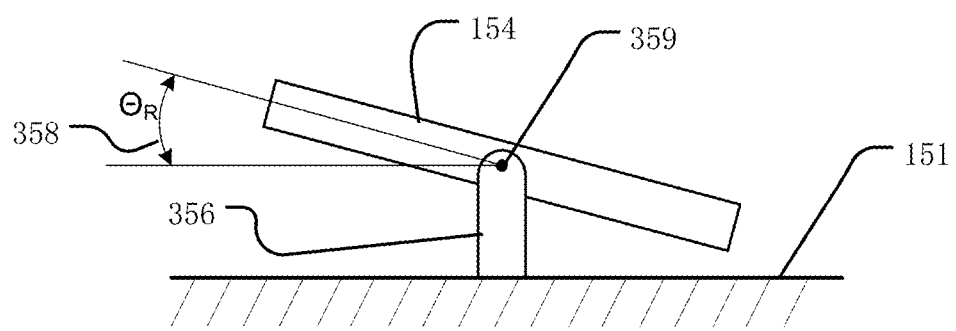
FIG. 3B illustrates an example positioner for the secondary antenna of an example antenna system.

FIG. 3B illustrates an example of a portion of the antenna system 150 including secondary antenna 154 and a positioner 356 (e.g., mechanical positioner) for the secondary antenna 154. The positioner 356 for the secondary antenna 154 may be different than the positioner 300 for the primary antenna 152. The positioner 356 may be, for example, a single axis positioner (e.g., single axis tilt positioner, single axis rotating positioner). Alternatively, the positioner 356 may be a two-axis positioner. With a two-axis positioner, the secondary antenna 154 may be a non-scanning antenna (e.g., direct radiating array). Alternatively, the secondary antenna 154 may also include one electrical scan axis or may be capable of electrically scanning in two dimensions, which may or may not align with the axes of the positioner). The positioner 356 may be a two-axis tilt positioner (having two axes of tilt positioning) or may be a tilt over rotation positioner (e.g., elevation over azimuth).

The positioner 356 for the secondary antenna 154 may have a limited mechanical positioning range. For example, the positioner 356 for the secondary antenna 154 may have a nominal angle (e.g., center point of one or more positioning axes) that has a 90 degree elevation relative to the base of the antenna system 150. The positioning range of the positioner 356 may thus be capable of an elevation range of 90 degrees, plus or minus a tilt range 358 $\theta_R$, where $\theta_R$ may be, for example, 10 degrees, 20 degrees, 30 degrees, or the like. In some cases, the range 358 of the positioner 356 may be limited by an available volume under the radome 156, which may have swept volume having a lower cross-sectional area over the secondary antenna 154 than over the primary antenna 152. Thus, the range 358 of the positioner 356 may be limited by a height of a pivot axis 359 above a base 151 of the antenna system 150 (e.g., accounting for a thickness of the secondary antenna 154). In some examples, the secondary antenna 154 may have an aperture that is not square or circular (e.g., oval or rectangular), in which case the range 358 of the positioner 356 (e.g., for a two-axis tilt positioner) may be different for the different axes.

A field of view of the secondary antenna 154 may be limited due to the limited mechanical positioning range of the positioner 356. Thus, in some cases, a positioning of the aircraft 102 relative to the target satellite 110 may result in the target satellite 110 being located outside a field of view of the secondary antenna 154. In other words, the limited mechanical positioning range of the positioner 356 may induce pointing error from the secondary antenna 154 to the target satellite 110. The degree of the pointing error may be a function of how far outside the target satellite 110 is of the field of view of the secondary antenna. A field of view of the primary antenna 152 may also be limited due to a limited mechanical positioning range of a positioner of the primary antenna 152.

As described herein, the primary antenna 152 and secondary antenna 154 may be differently arranged. In some examples, the primary antenna 152 and the secondary antenna 154 may be configured to provide different fields of views. The field of view of the primary antenna 152 may also be larger than the field of view of the secondary antenna 154. The field of view of the primary antenna 152 and the secondary antenna 154 may be overlapping or non-overlapping. And the composite field of view of the primary antenna 152 and the secondary antenna 154 may cover a larger area—e.g., may provide a 360° field of view. Thus, for a particular positioning of the aircraft 102 relative to the target satellite 110—e.g. based on an attitude of the aircraft 102 that causes the target satellite 110 to leave a field of view of the primary antenna 152, the target satellite may enter a field of view of the secondary antenna 154.

The antenna selection system 200 can switch between the primary antenna 152 and the secondary antenna 154 based on one or more thresholds associated with a level of pointing accuracy to the target satellite 110. The one or more thresholds can be based on relative positioning of the aircraft 102 to a target satellite 110, a field of view boundary, and/or pointing error and can vary from example to example.

In some examples, the same threshold can be used for switching from the primary antenna 152 to the secondary antenna 154, and for switching from the secondary antenna 152 to the primary antenna 152. In other words, the antenna selection system 200 can switch from the primary antenna 152 to the secondary antenna 154 when the target satellite 110 leaves, or is leaving, a field of view of the primary antenna 152 and switch back to the primary antenna 152 when the target satellite 110 renters, or is about to reenter, the field of view of the primary antenna 152. In some other examples, the threshold for switching from the primary antenna 152 to the secondary antenna 154 can be different than the threshold for switching from the secondary antenna 154 to the primary antenna 152. In such a case, the antenna selection system 200 can avoid rapidly switching between the antennas 152, 154 when the aircraft 102 is near the boundary of the field of view of the primary antenna 152.

In some examples, the antenna selection system 200 may determine when to switch based on a current or predicted location of the target satellite 110 relative to the aircraft 102—e.g., based on determining that a current location of the aircraft 102 causes the target satellite 110 to fall outside a field of view of the primary antenna 152. The antenna selection system 200 may use GPS information for the aircraft 202 and/or target satellite 110 to determine a current geographic location of the target satellite 110 relative to the aircraft 102. Additionally, or alternatively, the antenna selection system 200 may use trajectory information for the aircraft 102 and/or the target satellite 110 to determine a predicted geographic location of the target satellite 110 relative to the aircraft 102.

In some examples, the antenna selection system 200 may determine when to switch based on a positioning of the aircraft 102—e.g., based on determining that a current positioning of the aircraft 102 causes the target satellite 110 to fall outside a field of view of the primary antenna 152. The antenna selection system 200 may use attitude information for the aircraft 102 to determine boundaries for a field of view of the primary antenna 152. Additionally, or alternatively, may use a pointing error of the primary antenna 152 to the target satellite 110 determine when to switch based on a positioning of the aircraft 102. For example, the antenna selection system 200 may switch to the secondary antenna 154 after determining that a pointing error of the primary antenna 152 exceeds a threshold—e.g., due to the positioning of the aircraft.

Figure 4A:
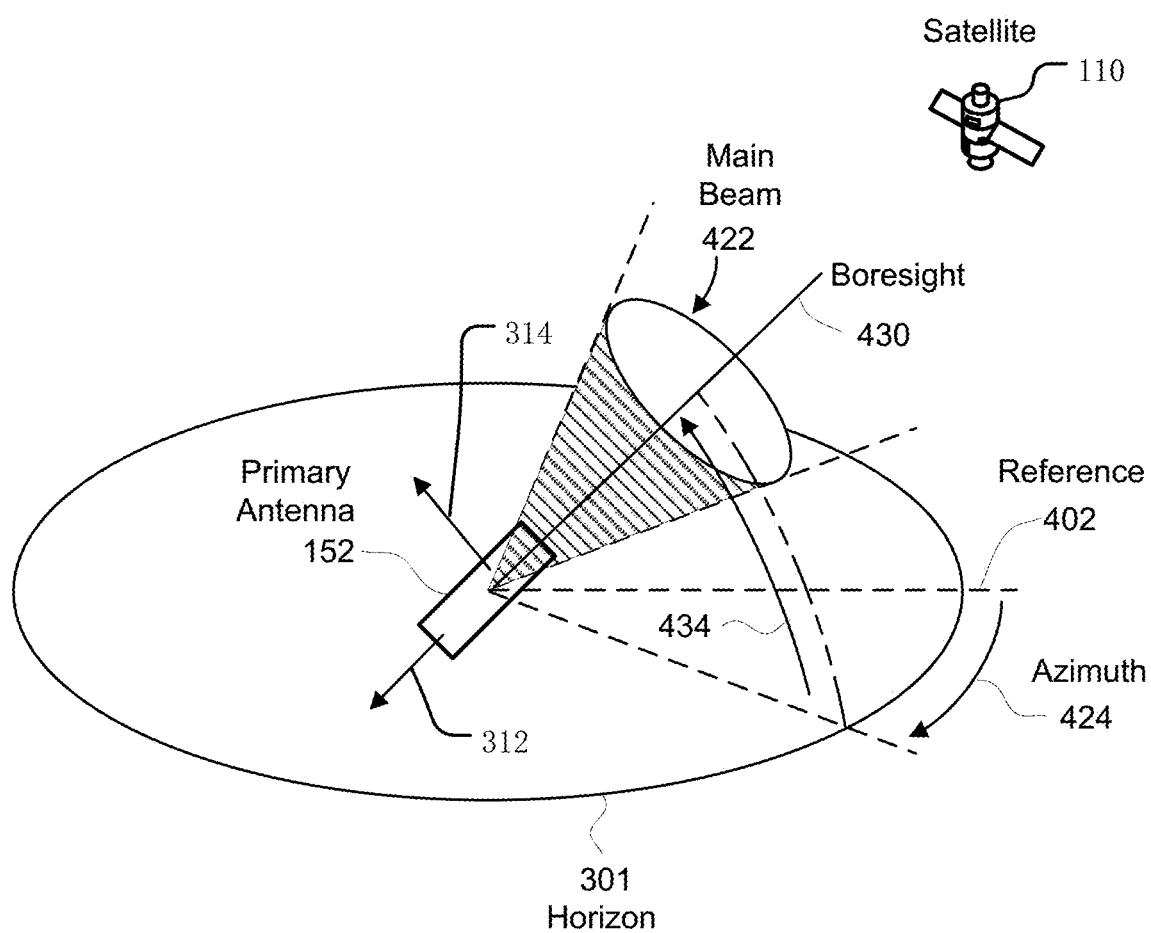
FIG. 4A illustrates a perspective view of the main beam of an example asymmetric antenna pattern of an example primary antenna.

FIG. 4A illustrates a perspective view of the main beam 422 of an example asymmetric antenna pattern of an example primary antenna 152. The main beam 422 has a 3-dB (half power) contour with an elliptical shape about boresight 430. The positioner 300 (FIG. 3A) can move the primary antenna 152 to point the boresight 430 of the main beam 422 is the direction of the target satellite 110. The direction can be described in terms of azimuth 424 and elevation 434. Azimuth 424 refers to the angle between boresight 430 and reference 402, and elevation 434 refers to the angle between boresight 430 and horizon 401.

Figure 4B:
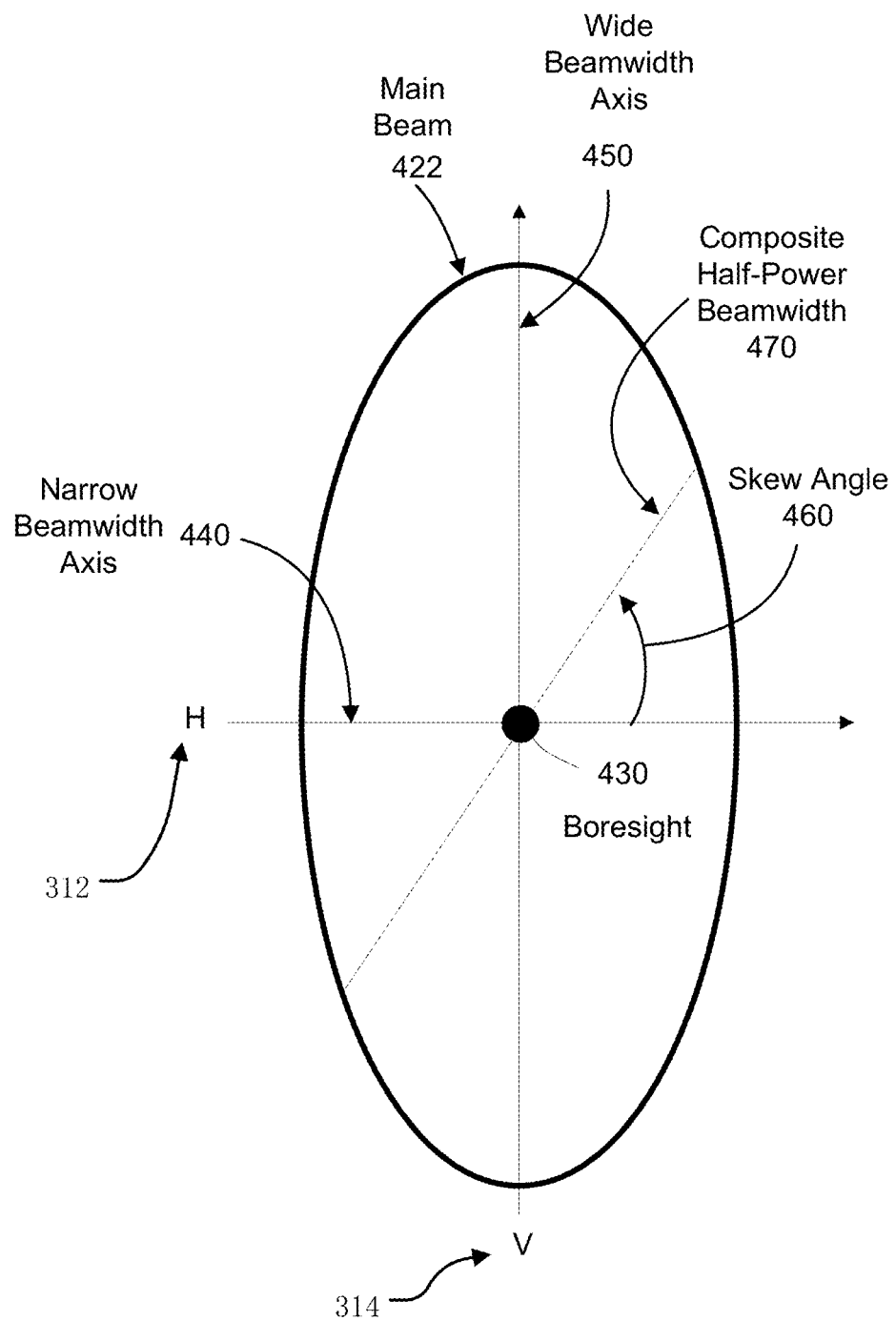
FIG. 4B illustrates an example half-power contour of the asymmetric antenna pattern of main beam FIG. 4A.

FIG. 4B illustrates an example half-power contour of the asymmetric antenna pattern of main beam 422 FIG. 4A. The main beam 422 has a first half-power beamwidth (hereinafter referred to as "horizontal half-power beamwidth") along the narrow beamwidth axis 440 that corresponds the horizontal axis 312 of the primary antenna 152, and a second half-power beamwidth (hereinafter referred to as "vertical half-power beamwidth) along the wide beamwidth axis 450 corresponding to the vertical axis 314 of the primary antenna 152. The horizontal half-power beamwidth and the vertical half-power beamwidth can vary from example to example. In some examples, the vertical half-power beamwidth is at least three times greater than the horizontal half-power beamwidth, such as being at least four times greater. For example, in some examples the vertical half-power beamwidth can be less than three degrees, and the horizontal half-power beamwidth can be less than one degree. Alternatively, the vertical half-power beamwidth and the horizontal half-power beamwidth may be different than the examples above.

As shown in FIG. 4B, the main beam 422 has a skew angle 460. As used herein, "skew angle" refers to the angle between the narrow beamwidth axis of the main beam of an antenna (e.g., narrow beamwidth axis 440 of the main beam 422), and a line defined by the target satellite 110 and the non-target satellite 120. The half-power beamwidth of the main beam 422 along the line defined by the target satellite 110 and non-target satellite 120 is referred to herein as a "composite half-power beamwidth" 470. The composite half-power beamwidth 470 is a mixture of the half-power beamwidths along the narrow beamwidth axis and wide beamwidth axis respectively and depends on the skew angle 460. For example, in examples in which the target satellite 110 and the non-target satellite 120 are geostationary satellites along the geostationary arc, the skew angle 460 is the angle between the narrow beamwidth axis 440 and the geostationary arc, and the composite half-power beamwidth 470 is the beamwidth along the geostationary arc.

The skew angle 460, and thus the composite half-power beamwidth 470, varies depending upon the geographic location of the aircraft 102 that includes the antenna system 150. For example, if the antenna system 150 is located at the same longitude as the target satellite 110, the skew angle 460 is zero degrees and the composite half-power beamwidth 470 is the horizontal half-power beamwidth along the narrow beamwidth axis 440. In such a case, the composite half-power beamwidth 470 can be narrow enough to satisfy interference requirements with the non-target satellite 120. However, if the antenna system is located at a different longitude than the target satellite 110, the skew angle 460 is non-zero and the composite half-power beamwidth 470 is a mixture of the vertical half-power beamwidth and the horizontal half-power beamwidth. As a result, at certain geographic locations, the composite half-power beamwidth 470 can be wide enough to cause excessive interference with the non-target satellite 120, if the primary antenna 152 were used to communicate with target satellite 110. In other words, due to the vertical half-power beamwidth along the wide beamwidth axis 450, at certain geographic locations within the service area of the target satellite 110, the interference level could exceed the threshold amount of interference with the non-target satellite 120 if the primary antenna 152 were used.

Figure 4C:
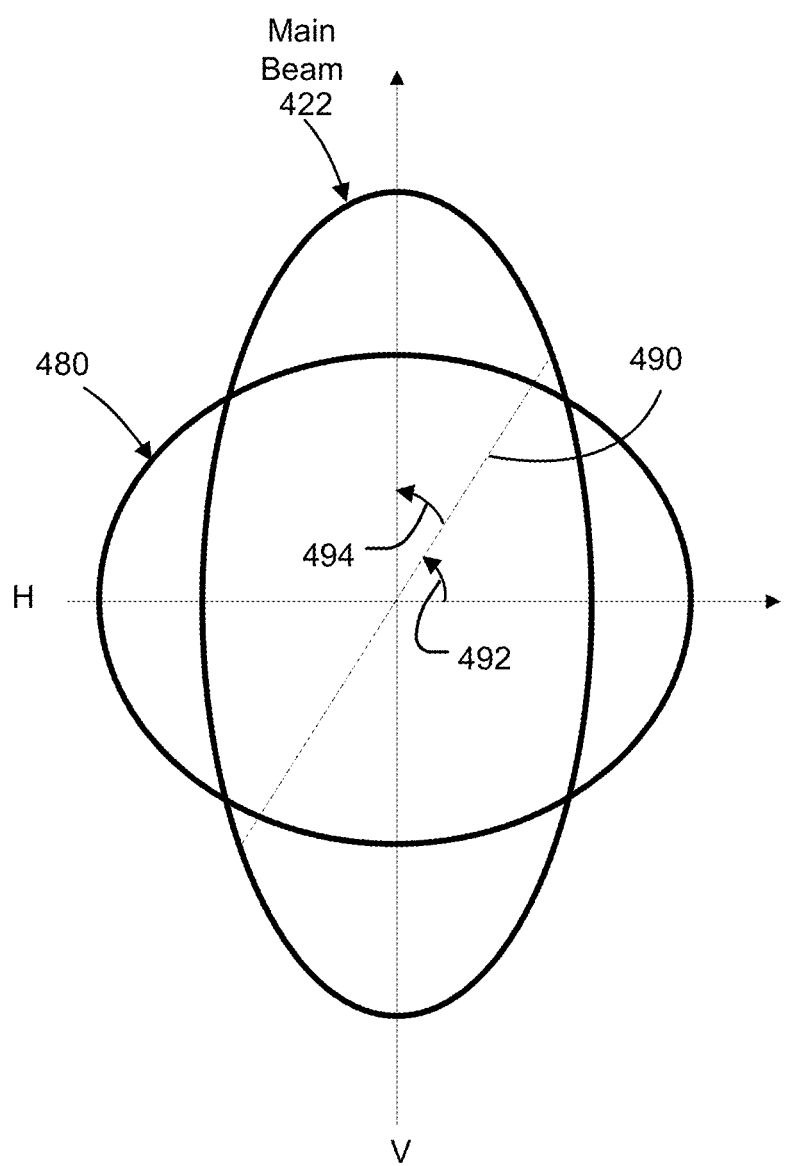
FIG. 4C illustrates an example contour of the main beam of the secondary antenna at a particular scan angle to the target satellite, overlaid with the contour of main beam of FIG. 4B.

FIG. 4C illustrates an example contour of the main beam 480 of the secondary antenna 154 at a particular scan angle to the target satellite 110, overlaid with the contour of main beam 422 of FIG. 4B. In examples in which the secondary antenna 154 is electronically scanned in at least one axis, the contour of the main beam 480 can vary with pointing direction (scan angle) to the target satellite 110. In other words, at least one of the vertical half-power beamwidth and the horizontal half-power beamwidth of the main beam 480 of the secondary antenna 154 can vary based on the geographic location of the aircraft 102. In examples in which the primary antenna 152 is fully mechanically steered, the main beam 422 does not vary with pointing direction.

The vertical half-power beamwidth and the horizontal half-power beamwidth of the main beam 480 of the secondary antenna 154 can vary from example to example. In some examples, the vertical half-power beamwidth is less than three times than the horizontal half-power beamwidth.

Line 490 represents the maximum acceptable skew angle for the main beam 422 of the primary antenna 152 that satisfies interference requirements with the non-target satellite 120. That is, for a range 492 of skew angles, the composite half-power beamwidth of the main beam 422 is less than or equal to a particular value, such that the amount of interference with the non-target satellite 120 when using the primary antenna 152 is at or below the threshold. Accordingly, for a range 494 of skew angles, the composite half-power beamwidth of the main beam 422 is greater than the particular value, such that the amount of interference with the non-target satellite 120 would exceed the threshold if the primary antenna 152 were used.

As can be seen in FIG. 4B, for the range 494 of skew angles, the composite half-power beamwidth of the main beam 480 of the secondary antenna 154 is less than the particular value of the composite half-power beamwidth of the main beam 422 along the line 490. Thus, for a group of geographic locations corresponding to the range 494 of skew angles at which the amount of interference with the non-target satellite 120 using the primary antenna 152 exceeds the threshold, the interference level when using secondary antenna 154 can be less than or equal to the threshold, such that the secondary antenna 154 can be used to communicate with the target satellite 110. The antenna selection system 200 can thus switch from the primary antenna 152 to the secondary antenna 154 when the skew angle reaches the maximum acceptable skew angle. Similarly, when the skew angle returns to a value below the maximum acceptable skew angle, the antenna selection system 200 can switch back to the primary antenna 152.

In the illustrated example, range 494 of skew angles extends from the line 490 to the wide beamwidth axis 450 (FIG. 4B) corresponding to the skew angle of ninety degrees. In such a case, the secondary antenna 154 can avoid excessive interference with the non-target satellite 120 at all the geographic locations at which the main beam 480 of the secondary antenna 154 has the contour illustrated in FIG. 4C. Alternatively, the range 494 of skew angles may not extend to the skew angle of 90 degrees.

The range 492 of skew angles and the range 494 of skew angles can vary from example to example. In some examples, range 492 of skew angles is at least 40 degrees, and the range 494 of skew angles is at least 30 degrees. For example, range 492 of skew angles may be from zero to sixty degrees, and range 494 of skew angles may be from sixty to ninety degrees.

Figure 5A:
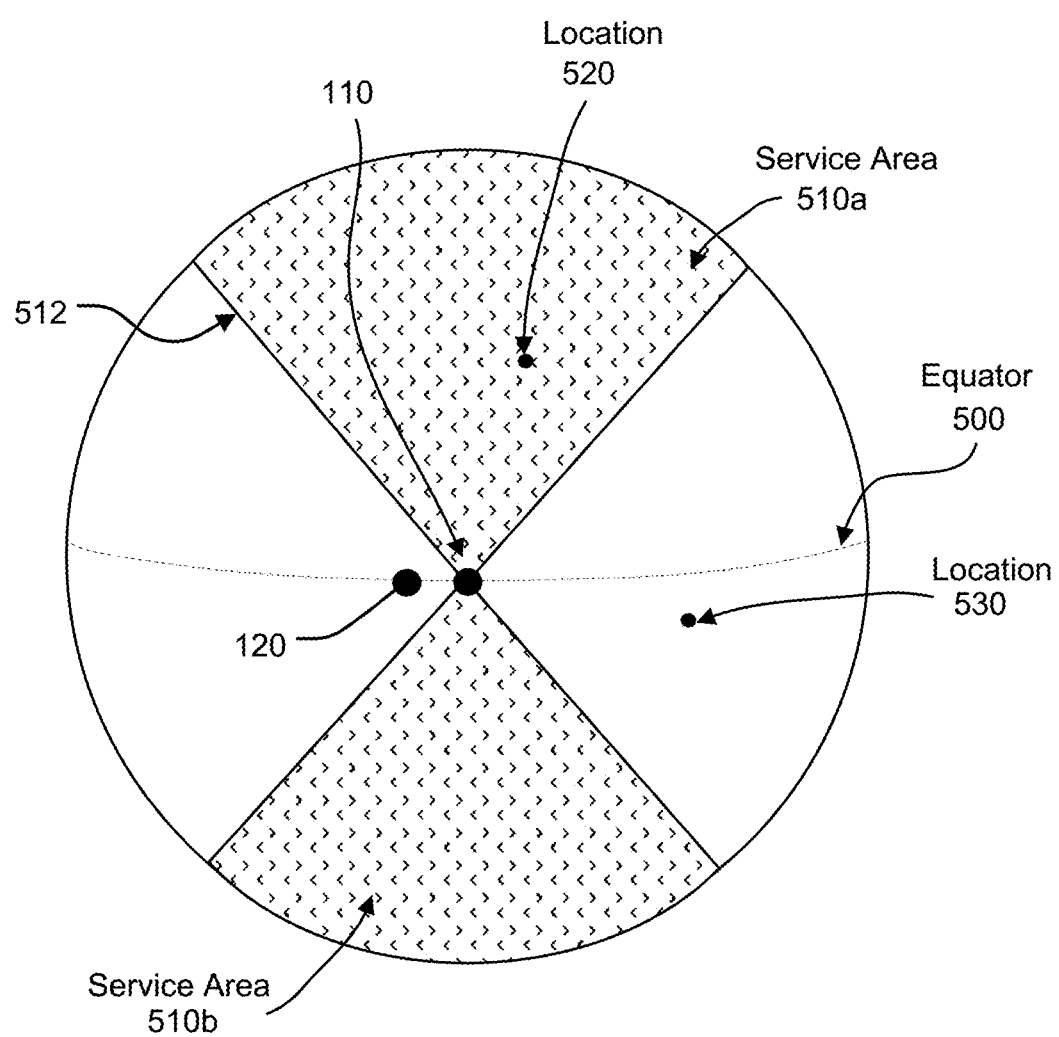
FIG. 5A illustrates an example acceptable service area of the primary antenna.

FIG. 5A illustrates an example acceptable service area 510a, 510b of the primary antenna 152. In the illustrated example, the target satellite 110 and the non-target satellite 120 are both geostationary satellites.

The acceptable service area 510a, 510b are geographic locations of the antenna system 150 where acceptable or desired performance characteristics for communicating with the target satellite 110 when using the primary antenna 152 are achieved—e.g., based on the amount of interference with the non-target satellite 120 being at or below the threshold. In other words, within the acceptable service area 510a, 510b, the skew angle of main beam of the primary antenna 152 is less than the maximum acceptable skew angle. The boundary 512 corresponds to the line 490 of FIG. 4B. In the illustrated example, the acceptable service area 510a, 510b account for the attitude of the aircraft 102.

The maximum acceptable skew angle, and thus the acceptable service area 510a, 510b of the primary antenna 152, can vary from example to example. The maximum acceptable skew angle can depend on the radiation pattern of the primary antenna 152, the locations of the target satellite 110 and non-target satellite 120, the threshold amount of interference with the non-target satellite 120, the transmission parameters of the return uplink signal 116, etc.

Figure 5B:
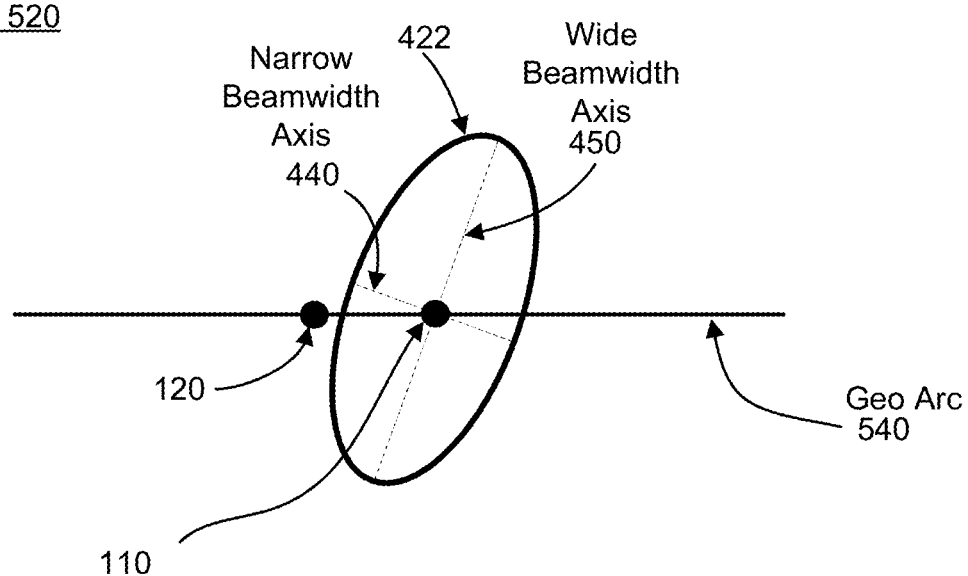
FIG. 5B illustrates the contour of the main beam of the primary antenna for an example geographic location within the acceptable service area.

As described above, the skew angle of the main beam 422 of the primary antenna 152, and thus the composite half-power beamwidth along the geo arc, varies depending upon the geographic location of the antenna system 150. FIG. 5B illustrates the contour of the main beam 422 of the primary antenna 152 for an example geographic location 520 within the acceptable service area 510a, 510b. In this example, the composite half-power beamwidth along the geo arc 540 is small enough that the amount of interference with the non-target satellite 120 is less than or equal to the threshold.

Figure 5C:
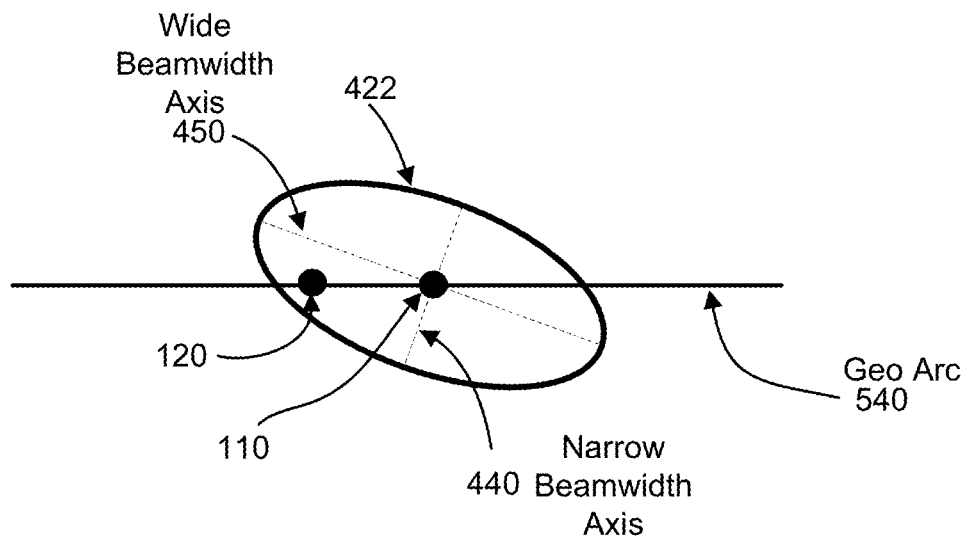
FIG. 5C illustrates the contour of the main beam of the primary antenna for an example geographic location outside the acceptable service area.

FIG. 5C illustrates the contour of the main beam 422 of the primary antenna 152 for an example geographic location 530 outside the acceptable service area 510a, 510b. In this example, the composite half-power beamwidth along the geo arc 540 is large enough to cause excessive interference with the non-target satellite 120, if the primary antenna 152 were used to communication with the target satellite 110.

Figure 5D:
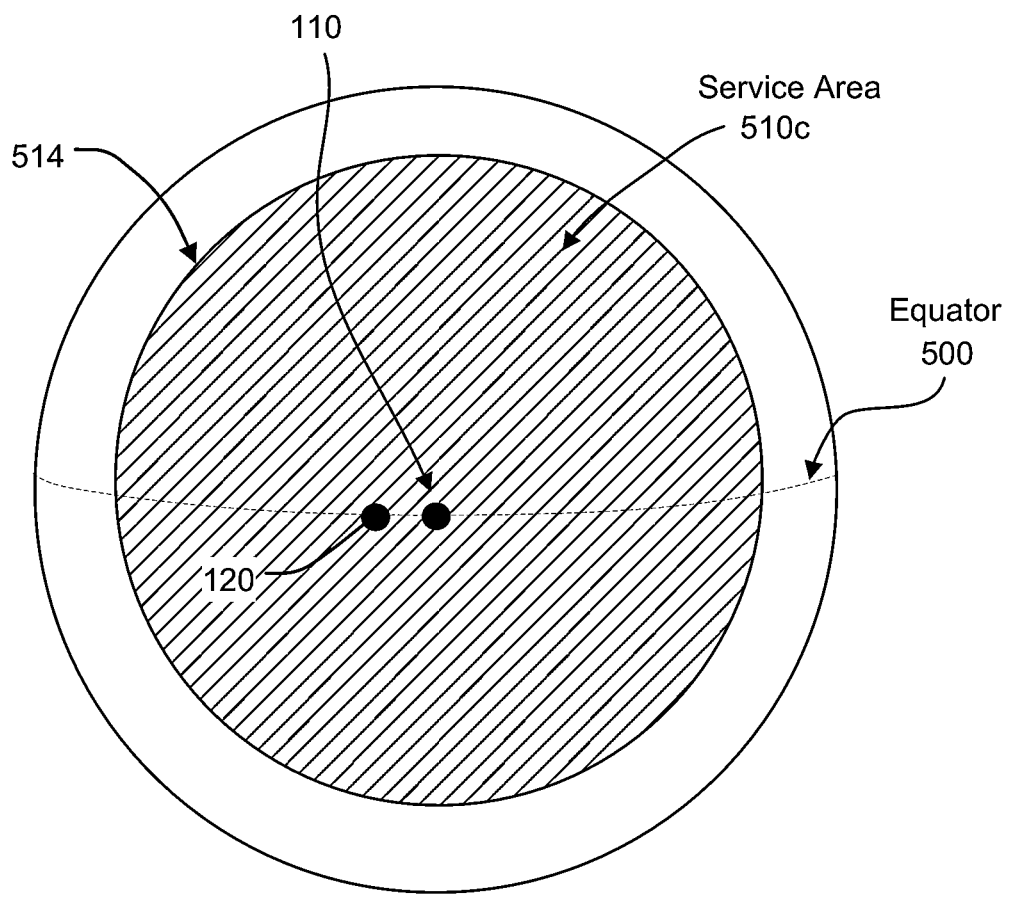
FIG. 5D illustrates an example acceptable service area of the secondary antenna.

FIG. 5D illustrates an example acceptable service area 510c of the secondary antenna 154. The acceptable service area 510c are geographic locations where acceptable or desired performance characteristics for communicating with the target satellite 110 when using the primary antenna 152 are not achieved but the performance characteristics are achieved when using the secondary antenna 154—e.g., the amount of interference with the non-target satellite 120 when using the secondary antenna 154 is at or below the threshold. In the illustrated example, the acceptable service area 510c is for a secondary antenna 154 that includes a non-movable, fully electronic scanning phased array antenna. At higher latitudes around the same longitude as the target satellite 110, the boundary 514 of the acceptable service area 510c can be due to scan loss of the array which precludes signal communication having acceptable performance characteristics with the target satellite 110. At lower latitudes near the equator 500, the boundary 514 can be due to an increase in the composite half-power beamwidth of the main beam 480 along the geo arc at larger scan angles to the target satellite 110.

As can be seen upon comparison of FIGS. 5A and 5D, in the illustrated example a portion of the acceptable service area 510c of the secondary antenna 154 overlaps with the acceptable service area 510a, 510b of the primary antenna 152. The determination of whether to use the primary antenna 152 or the secondary antenna 154 when the aircraft 102 is at a geographic location within this overlap can vary from example to example. For example, at a given geographic location with this overlap, the antenna selection system 200 can select the primary antenna 152 or secondary antenna 154 based on which antenna 152, 154 provides performance characteristics at the given geographic location for communicating with the target satellite 110. In examples in which the primary antenna 152 can provide better performance characteristics than the secondary antenna 154 for communicating with the target satellite 110 when the aircraft 102 is throughout the overlap, the antenna selection system 200 can select the primary antenna 152 for use.

Figure 5E:
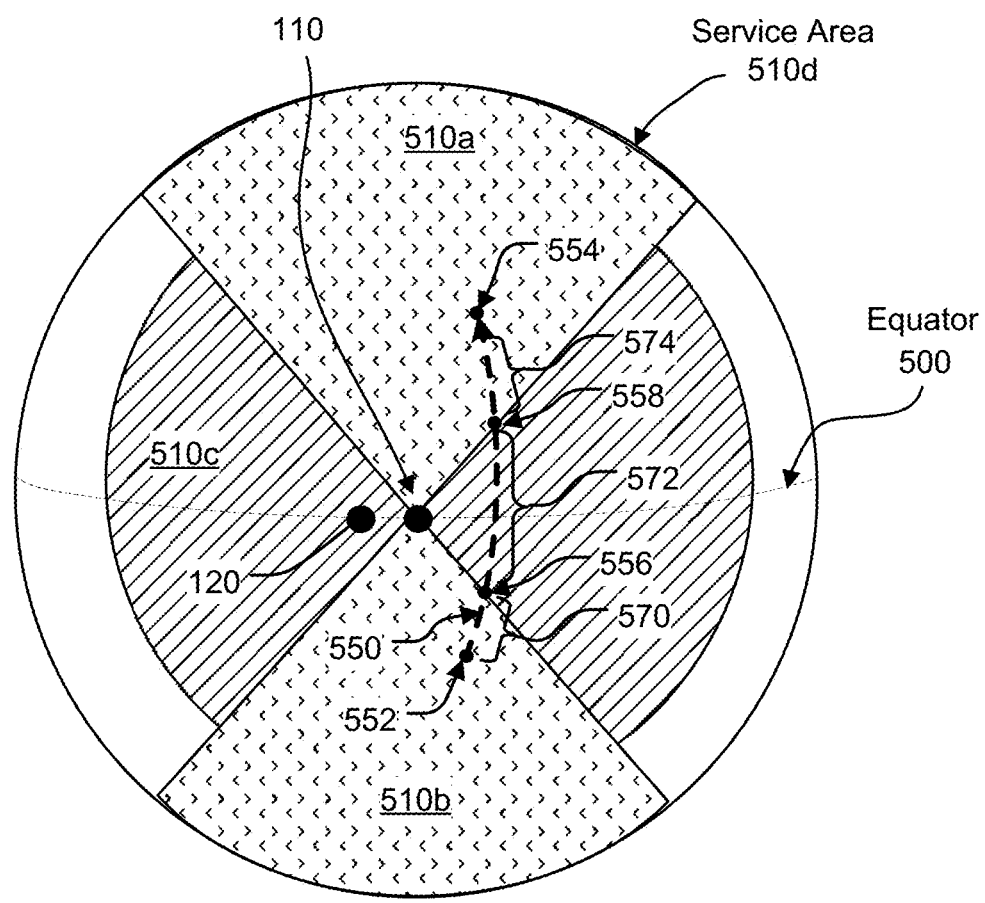
FIG. 5E illustrates an example composite acceptable service area for the antenna system.

FIG. 5E illustrates an example composite acceptable service area 510d for the antenna system 150. The composite acceptable service area 510d are geographic locations where acceptable or desired performance characteristics for communications with the target satellite 110 are achieved—e.g., the amount of interference with the non-target satellite 120, when using the primary antenna 152 or the secondary antenna 154, is at or below the threshold. The composite acceptable service area 510d is a union of the acceptable service area 510a, 510b of the primary antenna 152 and the acceptable service area 510c of the secondary antenna 154. As can be seen in FIG. 5E, the primary antenna 152 and the secondary antenna 154 provide a larger acceptable service area than a system that includes only one of the antennas 152, 154. Also, the acceptable service area 510, 510b of the primary antenna 152 may be incongruous with the acceptable service area 510-c of the secondary antenna 154—that is, the shape or boundaries of the acceptable service area 510, 510b of the primary antenna 152 may be different than the shape or boundaries of the acceptable service area 510-c of the secondary antenna 154.

In the illustrated example of FIG. 5E, the primary antenna 152 is selected by the antenna selection system 200 for use within the overlap between the acceptable service area 510a, 510b of the primary antenna 152 and the acceptable service area 510c of the secondary antenna 154. In some alternative examples, the antenna selection system 200 may select the secondary antenna 154 for use within some or all of the overlap.

Line 550 represents an example flight path for the aircraft 102 between source 552 and destination 554. At geographic locations along a first segment 570 of the flight path, the aircraft 102 is within the acceptable service area 510b of the primary antenna 152. Thus, along the first segment 570 the antenna selection system 200 selects the primary antenna 152 for communication with the target satellite 110. At geographic location 556 the aircraft 102 leaves the acceptable service area 510b of the primary antenna 152 and enters the acceptable service area 510c of the secondary antenna 154. Thus, at geographic location 556, the antenna selection system 200 switches communication with the target satellite 110 from the primary antenna 152 to the secondary antenna 154 and continues to use the secondary antenna 154 along the segment 572. At geographic location 558 the aircraft 102 enters the acceptable service area 510a of the primary antenna 152. Thus, at geographic location 558, the antenna selection system 200 switches communication with the target satellite 110 from the secondary antenna 154 to the primary antenna 152 and continues to use the primary antenna 152 along the segment 574 to the destination 554.

In the illustrated example the antenna selection system 200 switches communication between the primary antenna 152 and the secondary antenna 154 at the boundaries between the various acceptable service areas. In other examples, the switching along the flight path may occur at geographic locations different than these boundaries. For example, if at least a portion of the segment 574 adjacent geographic location 558 is within the overlap of the acceptable service areas 510a, 510c, the antenna selection system 200 may continue to use the secondary antenna 154 for some or all of that portion. In contrast, if the flight path were in the other direction, the antenna selection system 200 switches from the primary antenna 152 to the secondary antenna 154 at geographic location 558, since a portion of the segment 572 adjacent the geographic location 558 is not within the overlap of the acceptable service areas of the primary antenna 152 and the secondary antenna 154. In other words, the geographic locations at which the antenna selection system 200 switches between the primary antenna 152 and the secondary antenna 154 may depend on whether the aircraft 102 is moving from the acceptable service area 510a, 510b of the primary antenna 152 to the acceptable service area 510c of the secondary antenna 154, or is moving from the acceptable service area 510c of the secondary antenna 154 to the acceptable service area 510a, 510b of the primary antenna 152.

Figure 5F:
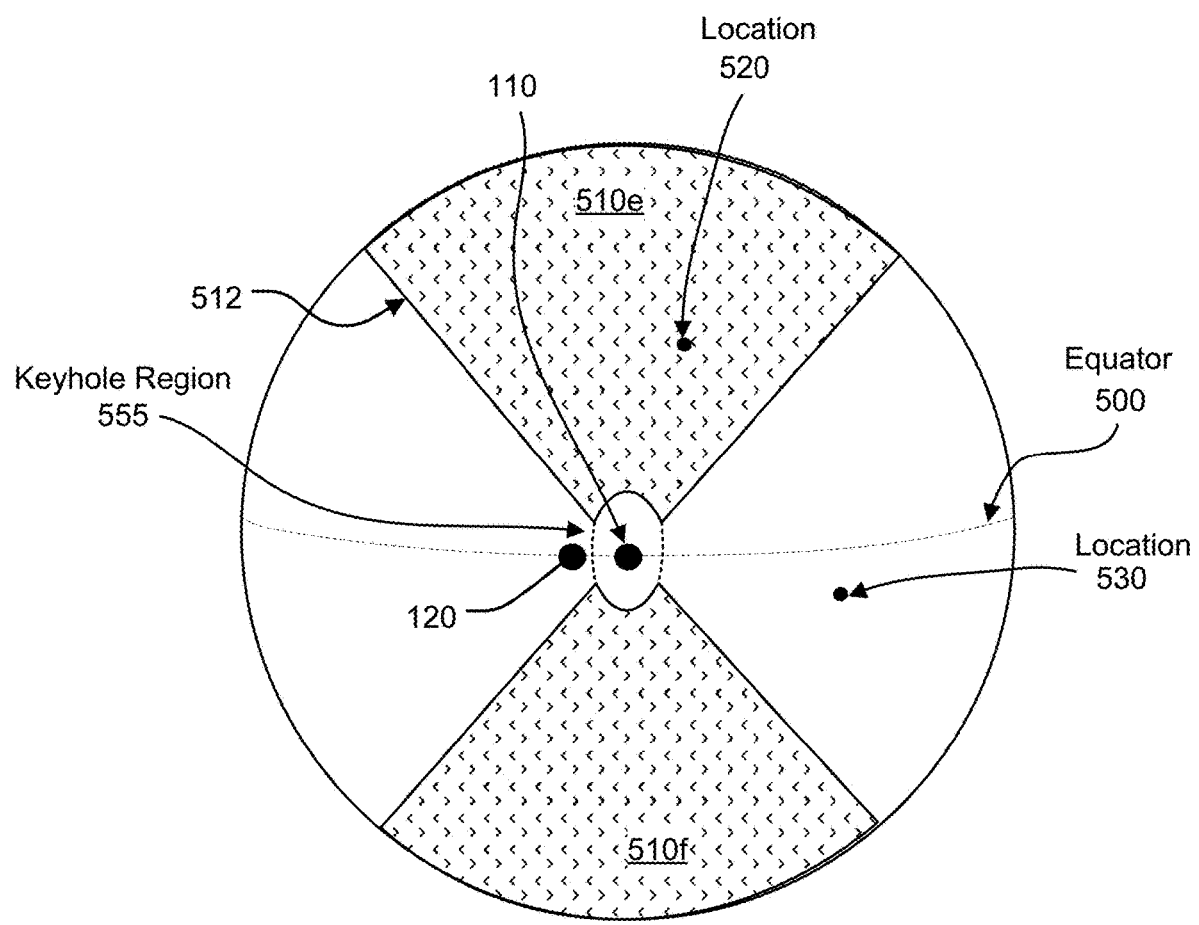
FIG. 5F illustrates an example acceptable service area of the primary antenna.

FIG. 5F illustrates an example acceptable service area 510e, 510f of the primary antenna 152. In the illustrated example, the target satellite 110 and the non-target satellite 120 are both geostationary satellites. However, similar service areas may be defined for non-geostationary satellites and may be dependent on an orbital position of the satellite (e.g., may vary with time).

The acceptable service areas 510e, 510f are geographic locations of the antenna system 150 where acceptable or desired performance characteristics for communications with the target satellite 110 are achieved—e.g., the amount of interference with the non-target satellite 120 when using the primary antenna 152, the slew rate of the primary antenna 152, the pointing error of the primary antenna 152 to the target satellite 110, and a distance from the primary antenna 152 to the target satellite 110 is at or below the threshold.

In some cases, the keyhole region 555 represents a geographic location of the antenna system 150 where pointing accuracy limitations of the primary antenna 152 may affect a reliability of a communication link between the primary antenna 152 and the target satellite 110. In some examples, a reliability of communications with target satellite 110 may be reduced when the antenna system 150 is within keyhole region 555. As described herein, the reliability of communications with target satellite 110 may be reduced within keyhole region 555 due to slew rate limitations of a positioner that is coupled with the primary antenna 152. These slew rate limitations may result in increased pointing errors while the aircraft 102 is located within keyhole region 555. In some cases, the amount of interference with the non-target satellite 120 when using the primary antenna 152 may be at or below a threshold when the antenna system 150 is located within some portions of keyhole region 555, while being at or above the threshold when the antenna system 150 is located within other portions of keyhole region 555. The keyhole region 555 may represent an area in which the antenna system 150 is substantially, or directly, below the target satellite 110. A size of the keyhole region 555 may be selected to provide additional margin to account for varying aircraft attitude. For example, a size of the keyhole region 555 may be selected to account for typical aircraft attitude variance while in level flight (e.g., not accounting for banking while turning). Thus, acceptable service areas 510e, 510f may correspond to acceptable service areas 510a, 510b, accounting for keyhole region 555 where it may be undesirable to use the primary antenna 152 due to signal quality degradation induced by pointing error.

In some cases, the keyhole region 555 represents an area in which a primary antenna has an elevation angle between $(90-\delta_\theta)$ degrees and $(90+\delta_\theta)$ degrees when the boresight of the primary antenna 152 is pointed in the direction of the target satellite. In some cases, $\delta^\theta$ may be equal to or less than 5 degrees, equal to or less than 10 degrees, or equal to or less than 15 degrees. For example, $\delta_\theta$ may depend on a type of positioner or a type of aircraft (e.g., maximum or typical banking angle). In some cases, the elevation angle is measured relative to a horizon. In other cases, the elevation angle is measured relative to a plane that is parallel to a base of the antenna system—e.g., during banking scenarios. In some cases, the positioner for primary antenna 152 may have an elevation range between 0 degrees and 90 degrees, and thus the keyhole region 555 may represent an area in which the primary antenna 152 has an elevation angle greater than $(90-\delta_\theta)$ degrees. In some cases, pointing the primary antenna 152 at the target satellite while in the keyhole region 555 may involve rapid azimuth movement to track the target satellite where small deviations in pointing error may involve large azimuth correction.

Figure 5G:
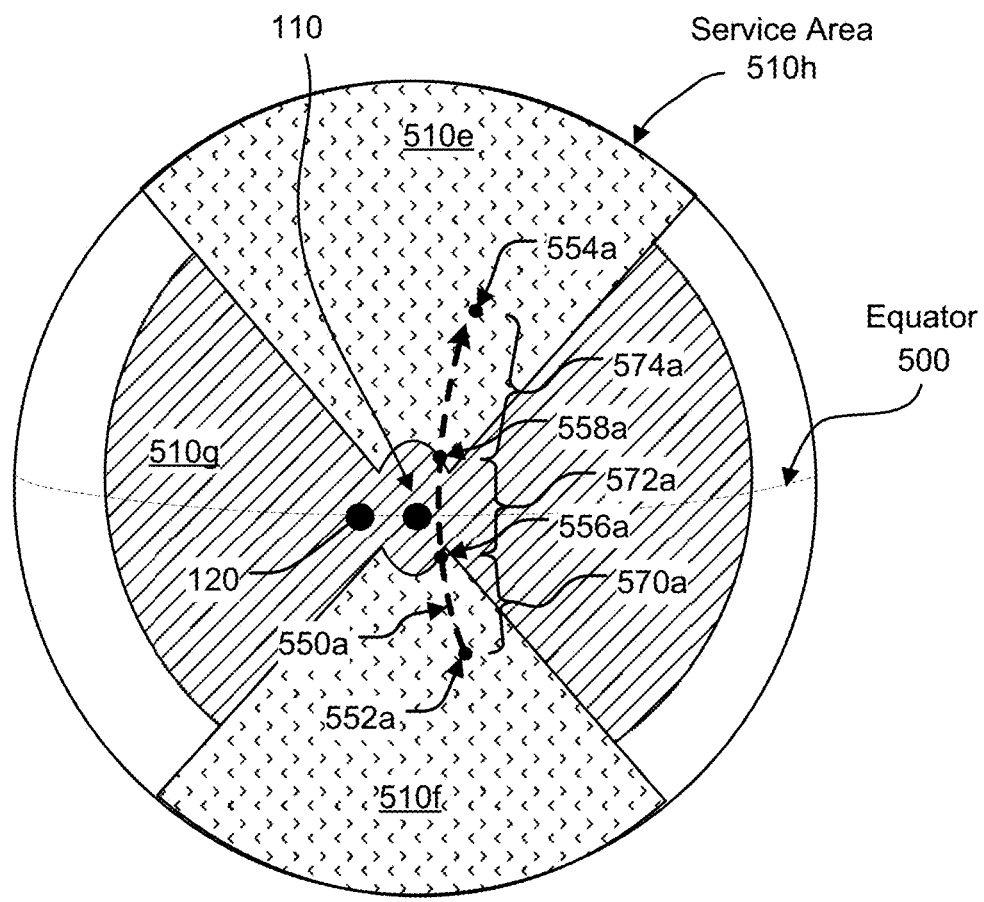
FIG. 5G illustrates an example composite acceptable service area for the antenna system.

FIG. 5G illustrates an example composite acceptable service area 510*h* for the antenna system 150. The composite acceptable service area 510*h* are geographic locations where acceptable or desired performance characteristics for communication with the target satellite 110 are achieved—e.g., the amount of interference with the non-target satellite 120, when using the primary antenna 152 or the secondary antenna 154, the slew rate of the primary antenna 152 or the secondary antenna 154, the pointing error of the primary antenna 152 or the secondary antenna 154 to the target satellite 110, and a distance from the primary antenna 152 or the secondary antenna 154 to the target satellite 110 is at or below a threshold. The composite acceptable service area 510*h* is a union of the acceptable service area 510*e*, 510*f* of the primary antenna 152 and the acceptable service area 510*g* of the secondary antenna 154. As can be seen in FIG. 5G, the primary antenna 152 and the secondary antenna 154 provides a larger acceptable service area than a system that includes only one of the antennas 152, 154.

In the illustrated example of FIG. 5G, the primary antenna 152 is selected by the antenna selection system 200 for use within the overlap between the acceptable service area 510*e*, 510*f* of the primary antenna 152 and the acceptable service area 510*g* of the secondary antenna 154. In some alternative examples, the antenna selection system 200 may select the secondary antenna 154 for use within some or all of the overlap.

Line 550*a* represents an example flight path for the aircraft 102 between source 552*a* and destination 554*a*. At geographic locations along a first segment 570*a* of the flight path, the aircraft 102 is within the acceptable service area 510*f* of the primary antenna 152. Thus, along the first segment 570*a* the antenna selection system 200 selects the primary antenna 152 for communication with the target satellite 110. At geographic location 556*a*, the aircraft 102 leaves the acceptable service area 510*f* of the primary antenna 152 and is within the acceptable service area 510*g* of the secondary antenna 154. Thus, at geographic location 556*a*, the antenna selection system 200 switches communication with the target satellite 110 from the primary antenna 152 to the secondary antenna 154 and continues to use the secondary antenna 154 along the segment 572*a*. In some cases, a positioner coupled with the primary antenna 152 attempts to point the primary antenna 152 at the target satellite 110 while the aircraft 102 travels along segment 572*a*. However, as described herein, due to slew rate limitations of the positioner, a pointing error of the primary antenna 152 to the target satellite 110 may exceed a threshold while the aircraft 102 travels along segment 572*a*.

At geographic location 558*a*, the aircraft 102 enters the acceptable service area 510*e* of the primary antenna 152. The antenna selection system 200 may switch communication with the target satellite 110 from the secondary antenna 154 to the primary antenna 152 at geographic location 558*a* and continue to use the primary antenna 152 along the segment 574*a* to the destination 554*a*. In some cases, at geographic location 558*a*, the secondary antenna 154 may still satisfy performance characteristics with the target satellite 110 at geographic location 558*a*. In some cases, at geographic location 558*a*, a performance characteristic (e.g., SNR, power spectral density) for the secondary antenna 154 may exceed the performance characteristic for the primary antenna 152. Thus, the antenna selection system 200 may switch back to the primary antenna 152 based on the performance characteristic for the primary antenna 152 satisfying the threshold, and independent of the performance characteristic for secondary antenna 154.

In the illustrated example, the antenna selection system 200 switches communication between the primary antenna 152 and the secondary antenna 154 at the boundaries between the various acceptable service areas. In other examples, the switching along the flight path may occur at geographic locations different than these boundaries. For example, if at least a portion of the segment 574*a* adjacent to geographic location 558*a* is within the overlap of the acceptable service areas 510*e*, 510*g*, the antenna selection system 200 may continue to use the secondary antenna 154 for some or all of that portion. In contrast, if the flight path were in the other direction, the antenna selection system 200 may switch from the primary antenna 152 to the secondary antenna 154 at geographic location 558*a*, since a portion of the segment 572*a* adjacent the geographic location 558*a* is not within the overlap of the acceptable service areas of the primary antenna 152 and the secondary antenna 154. In other words, the geographic locations at which the antenna selection system 200 switches between the primary antenna 152 and the secondary antenna 154 may depend on whether the aircraft 102 is moving from the acceptable service area 510*e*, 510*f* of the primary antenna 152 to the acceptable service area 510*g* of the secondary antenna 154, or is moving from the acceptable service area 510*g* of the secondary antenna 154 to the acceptable service area 510*e*, 510*f* of the primary antenna 152.

In another example of switching at geographic locations different than these boundaries, the antenna selection system 200 may switch back to the primary antenna 152 while the aircraft 102 travels along segment 572*a* if a rate of change of an azimuth angle of the primary antenna 152 falls below a threshold and/or if other performance characteristics and/or interference thresholds are satisfied.

In another example, the antenna selection system 200 may switch to the primary antenna 152 as soon as the aircraft enters acceptable service area 510*e* or acceptable service area 510*f*, regardless of whether performance characteristics for the secondary antenna 152 are superior to performance characteristics for the primary antenna 154 within an overlapping region—e.g., based on a favorability of the primary antenna 154 relative to the secondary antenna 152.

Figure 6A:
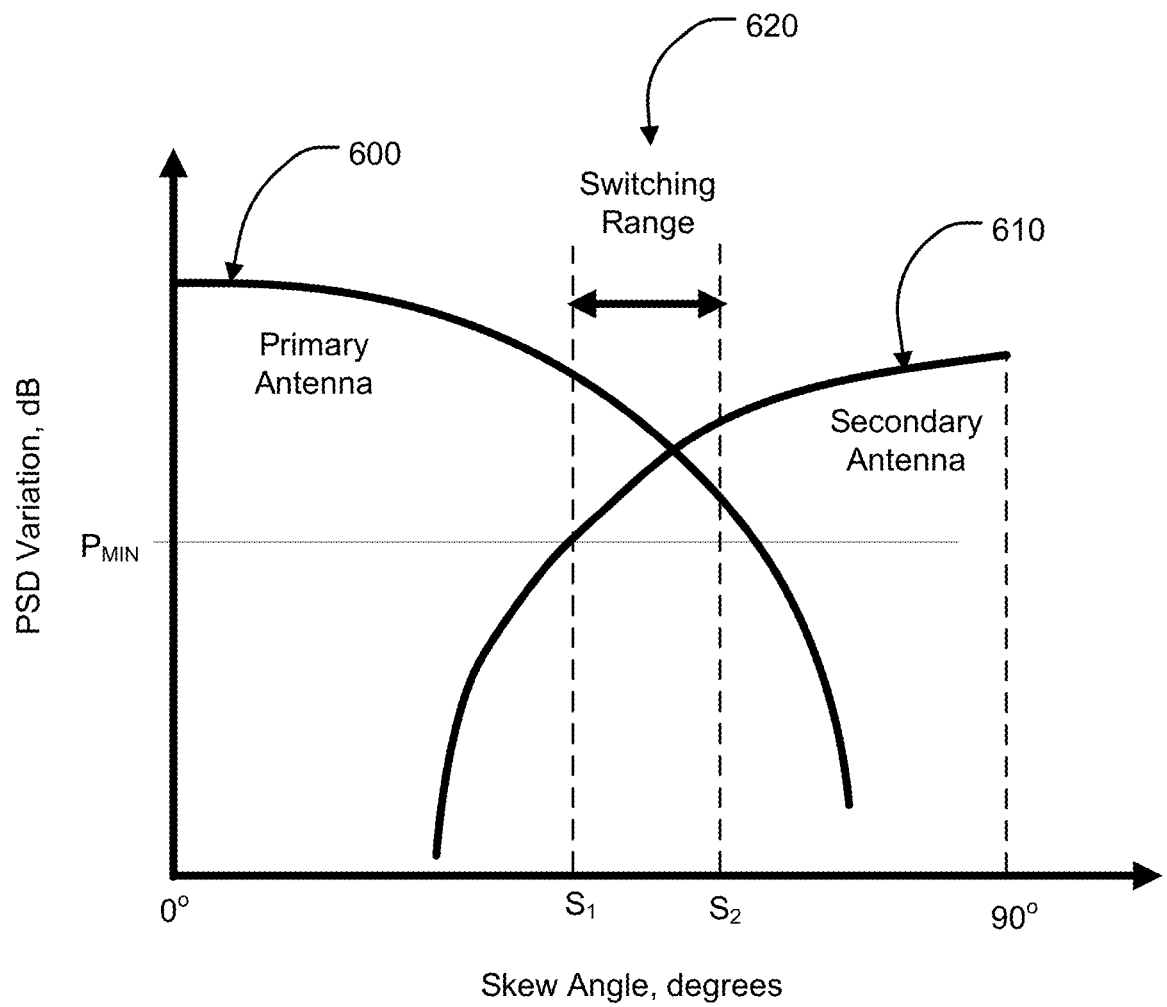
FIG. 6A is an example graph of maximum power spectral density (PSD) curves for the primary antenna and the secondary antenna with respect to skew angle that satisfy interference requirements with the non-target satellite.

FIG. 6A is an example graph of maximum power spectral density (PSD) curves for the primary antenna 152 and the secondary antenna 154 that satisfy interference requirements with the non-target satellite 120. As can be seen in the graph, the curve 600 of the maximum PSD for the primary antenna 152 decreases with increasing skew angle. This is due to the increase in the composite beamwidth of the main beam 422 of the primary antenna 152 as the skew angle increases. In contrast, the curve 610 of the maximum PSD for the secondary antenna 154 increases as the skew angle of the main beam 422 of the primary antenna 152 approaches 90 degrees. This is due to the increasing projected aperture of the secondary antenna 154 along the line defined by the target satellite 110 and the non-target satellite 120. In other words, the composite half-power beamwidth of the secondary antenna decreases as the skew angle of the primary antenna increases.

In the illustrated example of FIG. 6A, the switching by the antenna selection system 200 between the primary antenna 152 and the secondary antenna 154 occurs over a non-zero switching range 620 between skew angle $S_1$ and skew angle $S_2$. The switching range 620 corresponds to at least a portion of the overlap between the acceptable service areas of the primary antenna 152 and the secondary antenna 154. The switching by the antenna selection system 200 from the primary antenna 152 to the secondary antenna 154 occurs at skew angle $S_2$, whereas the switching from the secondary antenna 154 to the primary antenna 152 occurs at skew angle $S_1$. The skew angle $S_2$ may for example correspond to geographic locations (e.g., geographic location 556) along the boundary of the acceptable service area 510a, 510b of the primary antenna 152. The skew angle $S_1$ can correspond to geographic locations within the overlap and inside the boundary of the acceptable service area 510a, 510b of the primary antenna 152. By having separate skew angle values $S_1$, $S_2$, rapid switching can be avoided when the aircraft 102 flies near the boundaries of the acceptable service area 510a, 510b of the primary antenna 152 and the acceptable service area 510c of the secondary antenna 154. In alternative examples, the skew angle S1 and skew angle S2 may be the same.

In some examples, the switching range 620 is based on a duration for repositioning the primary antenna 154 to point at a target satellite 110 or to point at an approaching second target satellite 115. In some cases, the switching range 620 is based on a duration for resolving pointing inaccuracies of the primary antenna 154—e.g., a duration associated with obtaining pointing accuracies that are below a threshold.

As can be seen in FIG. 6A, the minimum PSD, $P_{MIN}$, that the antenna system 150 can provide by switching between the primary antenna 152 and the secondary antenna 154 over the range of skew angles from 0 to 90 degrees is significantly greater than can be provided by either antenna 152, 154 separately.

Figure 6B:
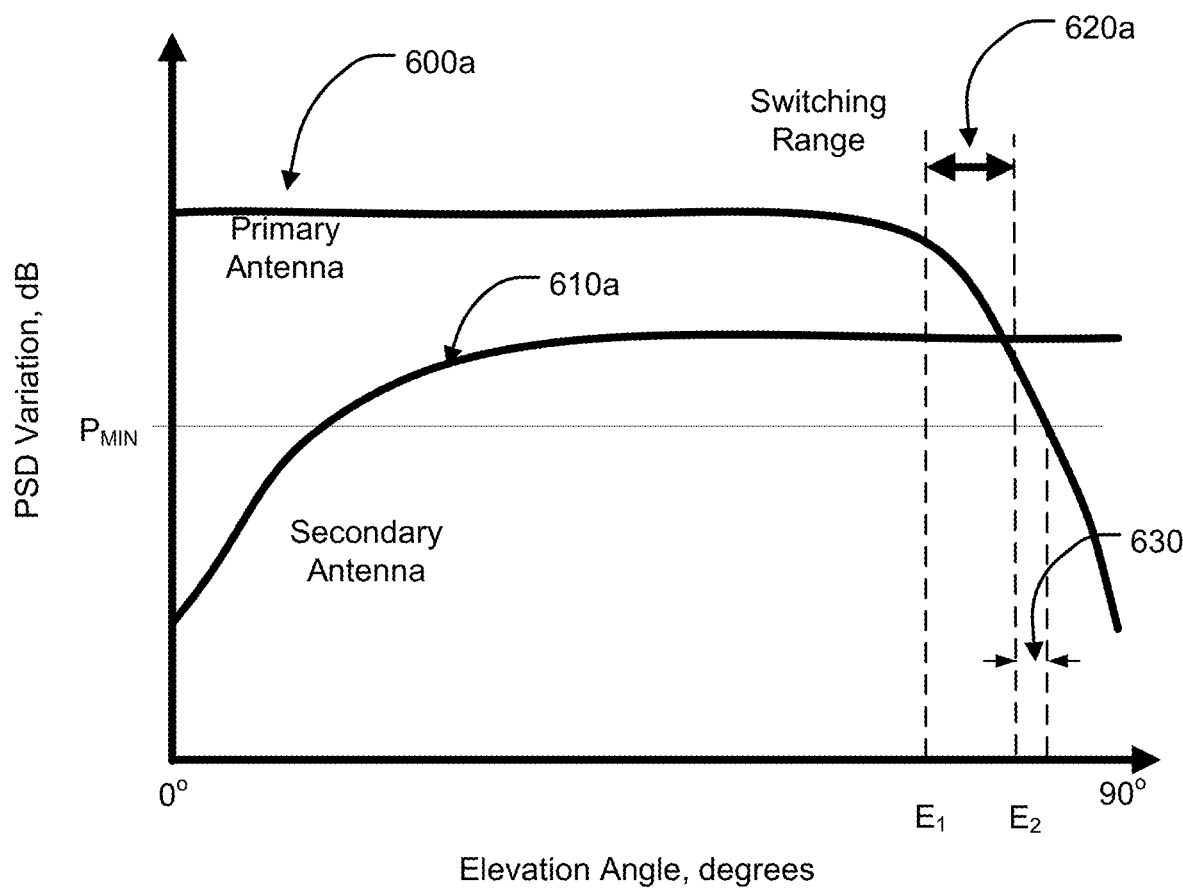
FIG. 6B is an example graph of maximum power spectral density (PSD) curves for the primary antenna and the secondary antenna with respect to elevation angle.

FIG. 6B is an example graph of maximum power spectral density (PSD) curves for the primary antenna 152 and the secondary antenna 154 with respect to elevation angle. As can be seen in the graph, the curve 600a of the maximum PSD for the primary antenna 152 decreases as an elevation angle of the primary antenna 152 approaches 90 degrees. This is due to the increase in a pointing error of the primary antenna 152 as the elevation angle increases (e.g., due to changes in azimuth angle exceeding a slew rate of the positioner as the aircraft 102 moves or experiences attitude changes). In contrast, the curve 610a of the maximum PSD for the secondary antenna 154 remains relatively constant as the elevation angle of the primary antenna 152 approaches 90 degrees. This is due to a type of positioner (e.g., two axis tilt positioner), electronic scanning, and/or the positioning range of the secondary antenna 154. Instead, the curve 610a of the maximum PSD for the secondary antenna 154 may decrease as the elevation angle approaches 0 degrees, which may be caused by a limited positioning and/or electronic scanning range of the secondary antenna 154. In some cases, the range of elevation angles over which the primary antenna 152 provides a suitable PSD may be greater than the range of elevation angles over which the secondary antenna 154 provides a suitable PSD (e.g., the primary antenna 152 may have a greater field of view than the secondary antenna 154).

In the illustrated example of FIG. 6B, the switching by the antenna selection system 200 between the primary antenna 152 and the secondary antenna 154 occurs over a non-zero switching range 620a between elevation angle $E_1$ and elevation angle $E_2$. The switching range 620a corresponds to at least a portion of the overlap between the acceptable service areas of the primary antenna 152 and the secondary antenna 154. The switching by the antenna selection system 200 between the primary antenna 152 to the secondary antenna 154 occurs at elevation angle $E_1$ and at elevation angle $E_2$, depending on whether the elevation angle is approaching or exiting the switching range 620a. The elevation angle $E_2$ may correspond, for example, to an offset 630 between an elevation angle where the PSD for the primary antenna 152 equals the minimum PSD, $P_{MIN}$. The elevation angles $E_1$ and $E_2$ may correspond to geographic locations (e.g., geographic location 556a and geographic location 558b) along the boundary of the acceptable service area 510a, 510b of the primary antenna 152.

As can be seen in FIG. 6B, the minimum PSD, $P_{MIN}$, that the antenna system 150 can provide by switching between the primary antenna 152 and the secondary antenna 154 over the range of elevation angles of the primary antenna 152 (e.g., from 0 to 90 degrees) is significantly greater than can be provided by either antenna 152, 154 separately.

Figure 7:
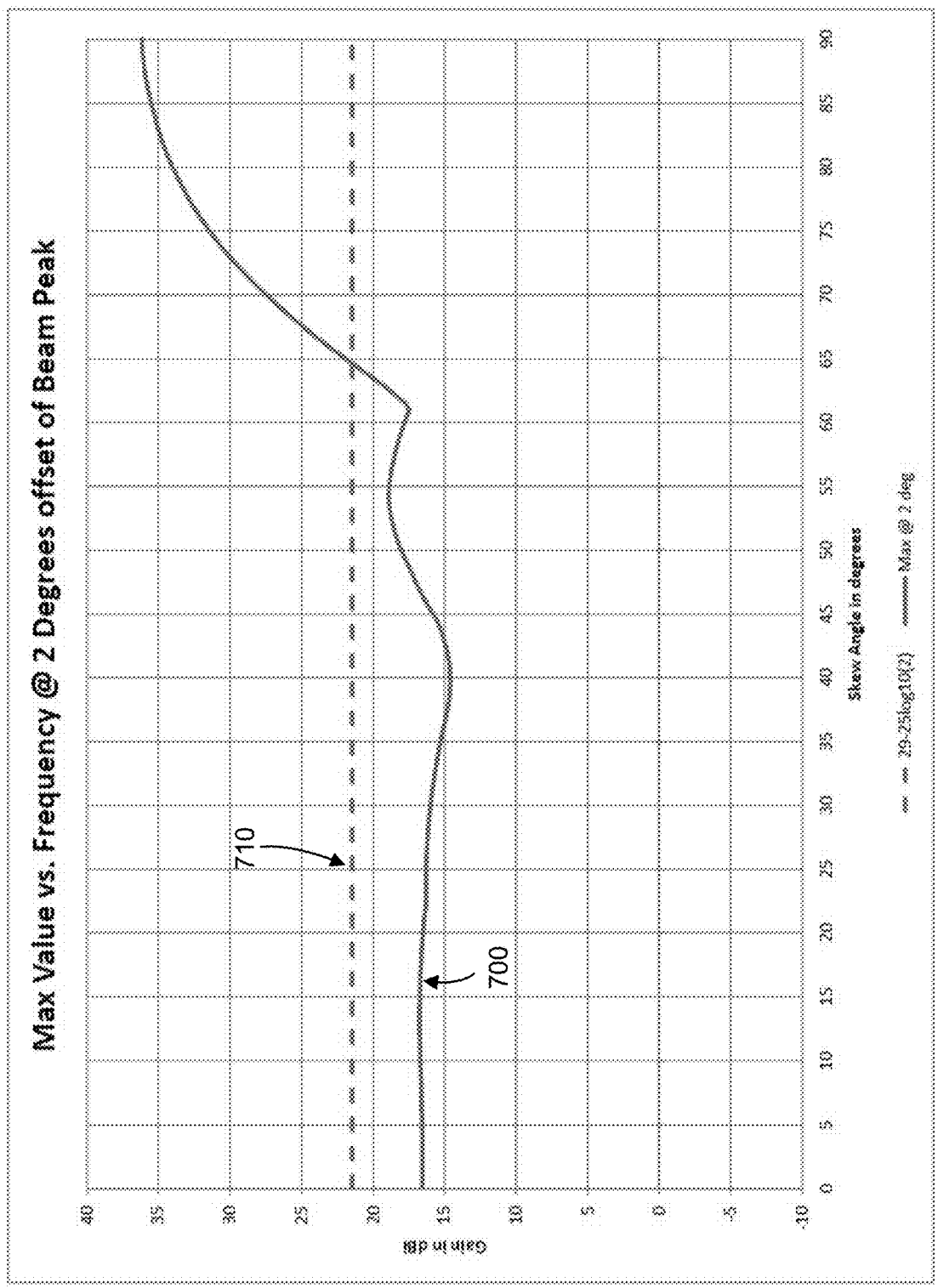
FIG. 7 is an example plot of the maximum value of the gain of the primary antenna at 2 degrees from boresight of the main beam versus skew angle.

FIG. 7 is an example plot 700 of the maximum value of the gain of the primary antenna 152 at 2 degrees from boresight of the main beam versus skew angle. Line 710 represents the maximum value of the gain that satisfies interference requirements with the non-target satellite 120. As can be seen in FIG. 7, the plot 700 crosses the line 710 at a skew angle value of about 65 degrees in this example. Thus, in this example the maximum acceptable skew angle for the primary antenna 152 is about 65 degrees.

Figure 8:
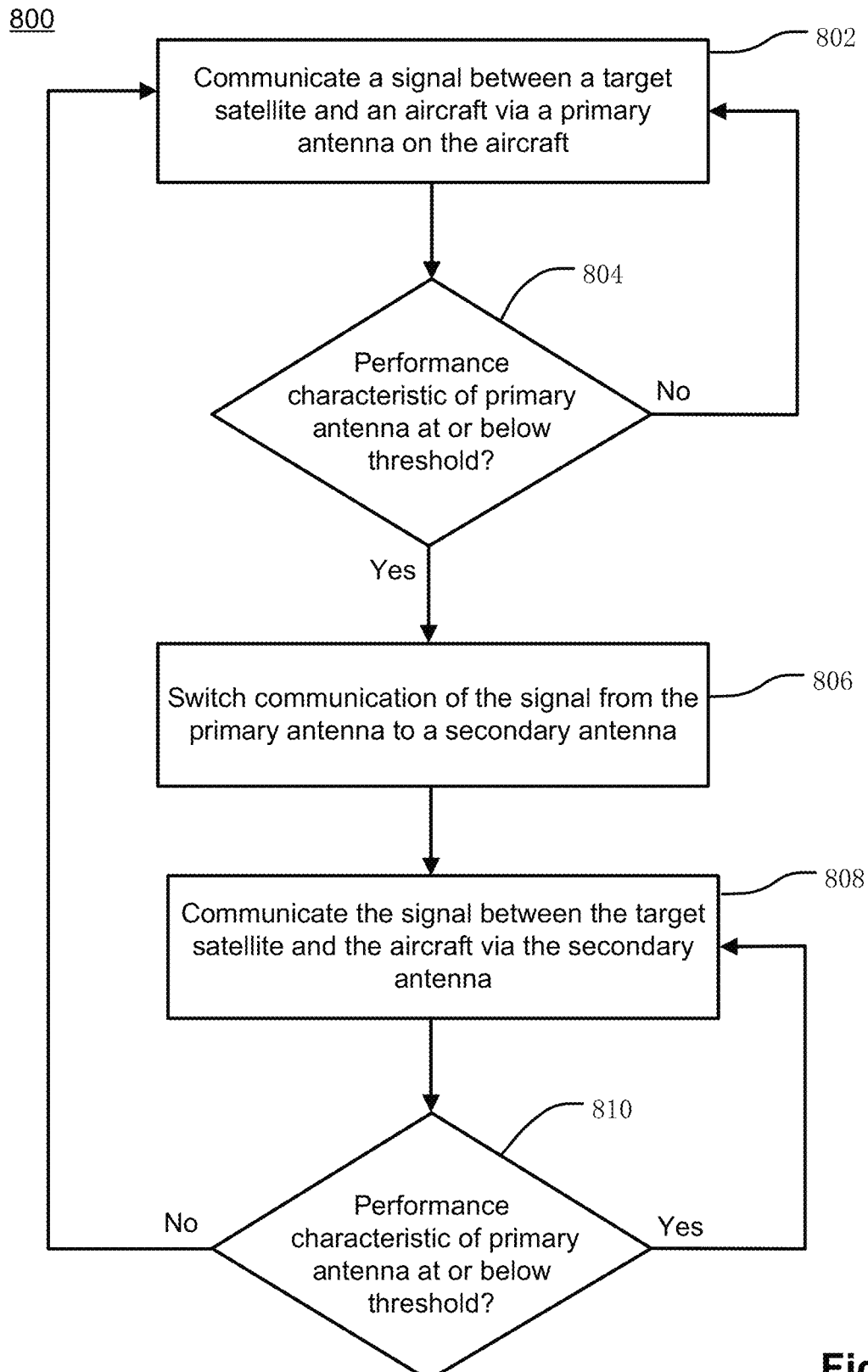
FIG. 8 illustrates an example process for switching between the primary antenna and the secondary antenna.

FIG. 8 illustrates an example process 800 for switching between the primary antenna 154 and the secondary antenna 154. Other examples can combine some of the steps, can perform the steps in different orders and/or perform different or additional steps to the ones illustrated in FIG. 8. In the illustrated example, the process 800 includes steps performed by the antenna selection system 200 discussed above.

At step 802, a signal is communicated between a target satellite and an aircraft via a primary antenna on the aircraft. In the illustrated example, the primary antenna is mechanically steerable and has an asymmetric antenna beam pattern with a narrow beamwidth axis and a wide beamwidth axis at boresight. The primary antenna can for example be the primary antenna 152 discussed above.

At step 804, the determination of whether performance characteristic(s) for communications with a target satellite have reached respective threshold(s) is made. For example, a determination that an amount of interference with a non-target satellite has reached a threshold—e.g., due to the wide beamwidth axis of the asymmetric antenna beam pattern may be made. Additionally, or alternatively, a determination that a pointing accuracy to a target satellite has reached a threshold—e.g., due to a positioning of the aircraft relative to the target satellite—may be made. If the performance characteristic(s) are above the respective threshold(s), the process 800 returns to step 802.

If the determination is made at step 804 that the performance characteristic(s) for communications with a target satellite are at or below the respective threshold(s), the process continues to step 806. At step 806, communication of the signal is switched from the primary antenna to a secondary antenna on the aircraft to improve the performance characteristic(s). The secondary antenna can for example be the secondary antenna 154 discussed above.

At step 808, the signal is communicated between the target satellite and the aircraft via the secondary antenna.

At step 810, the determination of whether performance characteristic(s) for communications with a target satellite have reached the respective threshold(s) is again made. The step 810 can for example be performed as the aircraft 102 moves. If the performance characteristic(s) are at or below the respective threshold(s), the process returns to step 808.

If the determination is made at step 810 that the performance characteristic(s) for communications with a target satellite using the primary antenna are above the respective threshold(s), the process returns to step 802.

While the present disclosure is described by reference to the examples detailed above, it is to be understood that these examples are intended in an illustrative rather than in a limiting sense. It is contemplated that modifications and combinations will readily occur to those skilled in the art, which modifications and combinations will be within the spirit of the disclosure and the scope of the following claims.

What is claimed is:

1. An antenna system for mounting on an aircraft, the antenna system comprising:
   a primary antenna for communication of first signals between the aircraft and one or more satellites;
   a secondary antenna for communication of second signals between the aircraft and the one or more satellites;
   a first transceiver coupled with the primary antenna to convert between the first signals and a first set of intermediate frequency (IF) signals;
   a second transceiver coupled with the secondary antenna to convert between the second signals and a second set of IF signals;
   a first modem coupled with the first transceiver and configured to convert between the first set of IF signals and a first data stream;
   a second modem coupled with the second transceiver and configured to convert between the second set of IF signals and a second data stream;
   a network access unit coupled with the first modem and the second modem; and
   an antenna selection system to control communication between the aircraft and the one or more satellites using the primary antenna and the secondary antenna, wherein the antenna selection system is configured to:
      indicate, to the network access unit, to switch from communication of the first data stream to communication of the second data stream based at least in part on a metric associated with positioning of the primary antenna relative to the one or more satellites;
      command, while communicating the second data stream, the primary antenna to reposition for communication of the first signals between the aircraft and the one or more satellites; and
      indicate, to the network access unit, to switch from communication of the second data stream to communication of the first data stream based at least in part on the repositioning of the primary antenna.

2. The antenna system of claim 1, wherein the first set of IF signals comprises a first receive IF signal and a first transmit IF signal, wherein the second set of IF signals comprises a second receive IF signal and a second transmit IF signal, wherein the first modem is configured to modulate uplink data of the first data stream to generate the first transmit IF signal and to demodulate downlink data from the first data stream, and wherein the second modem is configured to modulate uplink data of the second data stream to generate the second transmit IF signal and to demodulate downlink data from the second data stream.

3. The antenna system of claim 1, wherein for the switch from communication of the first data stream to communication of the second data stream, a second connection via the secondary antenna is established prior to breaking a first connection via the primary antenna.

4. The antenna system of claim 3, wherein for the switch from communication of the second data stream to communication of the first data stream, the first connection via the primary antenna is reestablished prior to breaking the second connection via the secondary antenna.

5. The antenna system of claim 1, wherein the one or more satellites comprise a first satellite and a second satellite, wherein the first signals are communicated with the first satellite prior to the switch from communication of the first signals to communication of the second signals, and wherein the metric associated with positioning of the primary antenna comprises the first satellite being expected to travel beyond an acceptable service area of the primary antenna.

6. The antenna system of claim 5, wherein the first signals are communicated with the second satellite subsequent to the switch from communication of the second signals to communication of the first signals.

7. The antenna system of claim 6, wherein the second signals are communicated with the second satellite.

8. The antenna system of claim 1, wherein the antenna selection system is configured to:
   activate, while the first modem is activated for obtaining the first data stream and prior to the switch from communication of the first signals to communication of the second signals, the second modem for obtaining the second data stream.

9. The antenna system of claim 1, further comprising:
   a wireless access point coupled with the network access unit and one or more user devices on the aircraft.

10. The antenna system of claim 9, wherein, to switch from communication of the first data stream to communication of the second data stream, the antenna selection system is configured to indicate a signal to the network access unit to communicate the second data stream to the one or more user devices.

11. The antenna system of claim 1, wherein the antenna selection system is configured to:
    enable, while the first modem is activated for communication of the first data stream and the second modem is activated for communication of the second data stream, one of the first transceiver or the second transceiver for transmission of a return uplink signal.

12. The antenna system of claim 1, wherein the antenna selection system is configured to:
    activate, while the second modem is activated for communication of the second data stream and prior to the switch from communication of the second data stream to communication of the first data stream, the first modem for communication of the first data stream.

13. The antenna system of claim 12, wherein the antenna selection system is configured to:
    deactivate, subsequent to activating the first modem for communication of the first data stream, the second modem.

14. The antenna system of claim 1, wherein the metric associated with positioning of the primary antenna relative to the one or more satellites comprises an elevation angle of a boresight of the primary antenna exceeding a threshold relative to a horizon.

15. The antenna system of claim 1, wherein the metric associated with positioning of the primary antenna relative to the one or more satellites comprises a pointing error to the one or more satellites.

16. The antenna system of claim 1, wherein the metric associated with positioning of the primary antenna relative to the one or more satellites comprises a slew rate of a positioner of the primary antenna exceeding a first threshold.

17. The antenna system of claim 1, further comprising a radome, wherein the primary antenna and the secondary antenna are under the radome.

\* \* \* \* \*